United States Patent
Ono et al.

(10) Patent No.: US 6,438,948 B2
(45) Date of Patent: Aug. 27, 2002

(54) DEVICE FOR PURIFYING THE EXHAUST GAS OF AN INTERNAL COMBUSTION ENGINE

(75) Inventors: Tomoyuki Ono; Tomihisa Oda, both of Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/755,169

(22) Filed: Jan. 8, 2001

(30) Foreign Application Priority Data

Jan. 11, 2000 (JP) .................................... 2000-006159
Jul. 10, 2000 (JP) .................................... 2000-208812
Aug. 24, 2000 (JP) .................................... 2000-254474

(51) Int. Cl.⁷ ............................................. F01N 3/02
(52) U.S. Cl. .................... 60/311; 60/278; 60/280; 60/295; 60/291
(58) Field of Search .................... 60/278, 285, 295, 60/297, 291, 292, 293, 280, 311

(56) References Cited

U.S. PATENT DOCUMENTS 4,719,751 A * 1/1988 Kume et al. ................. 60/278
5,195,316 A * 3/1993 Shinzawa et al. ............ 60/274
5,287,698 A * 2/1994 Shinzawa et al. ............ 60/286
5,319,930 A * 6/1994 Shinzawa et al. ............ 60/286

FOREIGN PATENT DOCUMENTS

JP     U 3-41112     4/1991

* cited by examiner

Primary Examiner—Thomas Denion
Assistant Examiner—Diem Tran
(74) Attorney, Agent, or Firm—Oliff & Berridge, PLC

(57) ABSTRACT

A device for purifying the exhaust gas of an internal combustion engine is disclosed. The device comprises a particulate trap disposed in the engine exhaust system, an exhaust gas recirculation passage communicating the upstream of the particulate trap in the engine exhaust system with the engine intake system, a control valve for controlling the amount of exhaust gas recirculated through the exhaust gas recirculation passage to be an optimum amount in accordance with an engine operating condition. In the device, an amount of the fresh air introduced into the engine intake system during a fuel-cut is detected, and an amount of particulate trapped by the particulate trap is estimated on the basis of the amount of fresh air detected after the control valve is opened to a predetermined opening degree.

14 Claims, 17 Drawing Sheets

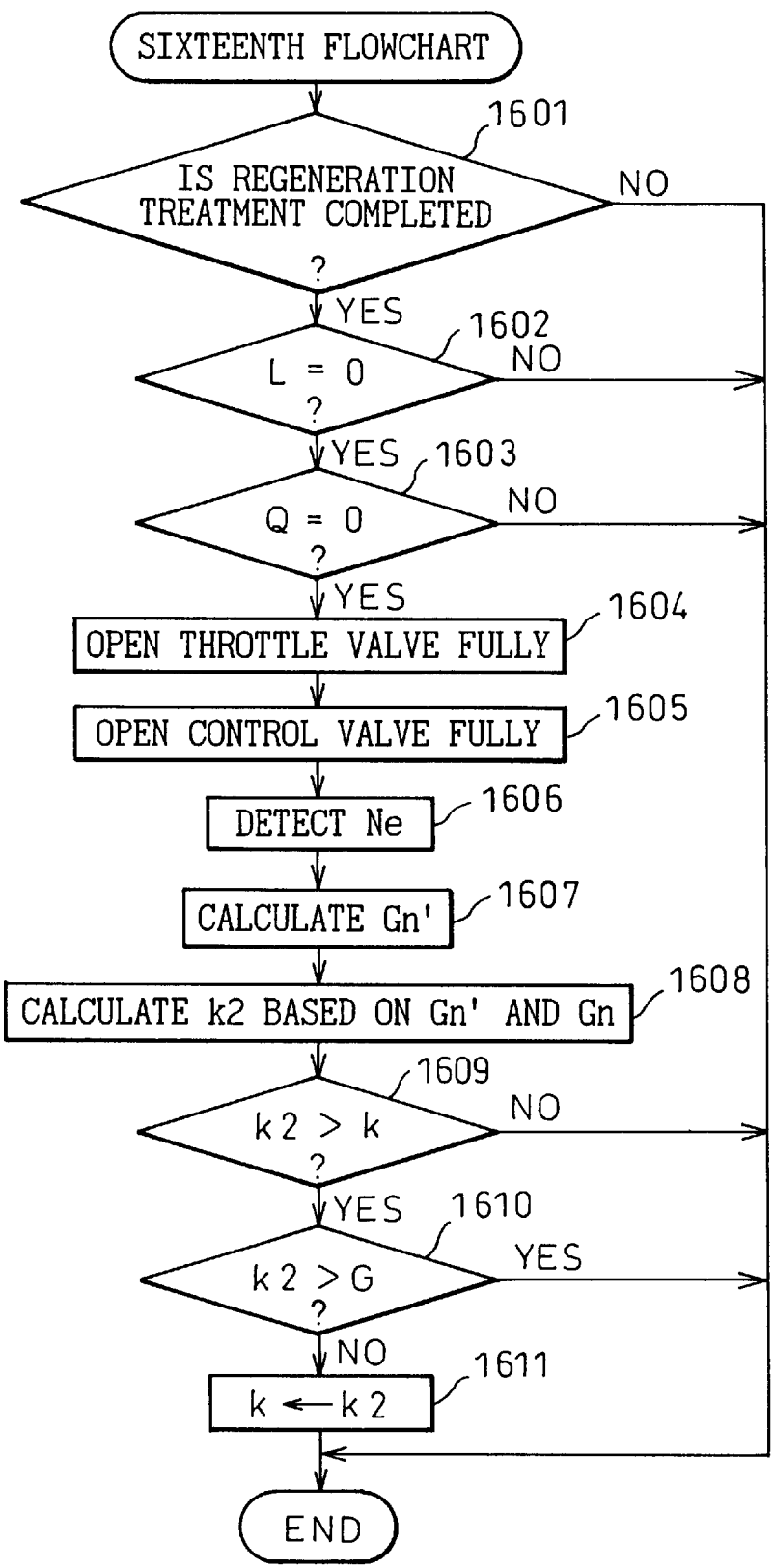

DEVICE FOR PURIFYING THE EXHAUST GAS OF AN INTERNAL COMBUSTION ENGINE

BACKGROUND OF THE INVENTION

1. Field of the Invention

The present invention relates to a device for purifying the exhaust gas of an internal combustion engine.

2. Description of the Related Art

The exhaust gas of an internal combustion engine and, particularly, of a diesel engine contains harmful particulates comprising carbon as a chief component, and it has been desired to lower the amount of particulates emitted into the atmosphere. It has therefore been proposed to dispose a particulate trap in the exhaust system of the diesel engine as a filter for trapping the particulates. Such a particulate trap could become a large resistance against the exhaust gas as the amount of trapped particulate increases. It therefore becomes necessary to regenerate the particulate trap itself by burning the trapped particulates.

When the exhaust gas temperature becomes high in high-engine-load and high-engine-speed operating conditions, and the like, the trapped particulates ignite spontaneously and the particulate trap can be regenerated. However, there is no guarantee that the high engine load and high engine speed operation conditions are frequently carried out. Generally, therefore, the regeneration treatment is executed by arranging a heater or oxidation catalyst in the particulate trap, and energizing the heater or supplying unburned fuel into the oxidation catalyst to cause the regeneration.

It therefore becomes necessary to determine the timing for regenerating the particulate trap. When the determined timing for regeneration is too early, the regeneration treatment is executed unnecessarily causing a problem that the battery must large or a large amount of fuel is consumed. When the determined timing for regeneration is too late, on the other hand, the resistance against the exhaust gas very greatly increases in the engine exhaust system causing a large drop in the engine output.

It is therefore desired to correctly determine the timing for regenerating the particulate trap. It has, for example, been proposed to determine the timing for regeneration relying upon the fact that an amount of trapped particulate increases with an increase in the distance which the vehicle has traveled. However, a distinct difference occurs in the amount of trapped particulate depending upon the operation conditions over a predetermined distance which the vehicle has traveled with this method, therefore, it is not possible to correctly determine the timing for regeneration.

Japanese Unexamined Patent Publication (Kokai) No. 3-41112 proposes the determination of a timing for regenerating the particulate trap by comparing the amount of measured fresh intake air with a reference value for every engine operation condition relying upon the fact that the amount of the fresh intake air decreases with an increase in the amount of trapped particulate.

By the way, in order to decrease an amount of NOx which is a harmful component produced by combustion, there has been widely known an exhaust gas recirculation (EGR) device that lowers the temperature of combustion by recirculating a part of the exhaust gas into the cylinders, and many internal combustion engines have been equipped with such an EGR device. The above-mentioned determination of timing for regeneration is rendered relatively correctly. To apply this to an internal combustion engine equipped with the EGR device, however, it becomes necessary to interrupt the recirculation of exhaust gas at the determination. In the normal engine operations, therefore, a large amount of NOx is produced during this period.

SUMMARY OF THE INVENTION

It is therefore an object of the present invention to correctly determine the timing for regenerating the particulate trap arranged in the exhaust system of an internal combustion engine equipped with an EGR device by correctly estimating an amount of particulate trapped by the particulate trap without increasing an amount of produced NOx.

According to the present invention, there is provided a device for purifying exhaust gas of an internal combustion engine comprising:

a particulate trap disposed in the engine exhaust system;

an exhaust gas recirculation passage communicating the upstream of the particulate trap in the engine exhaust system with the engine intake system;

a control valve for controlling the amount of exhaust gas recirculated through the exhaust gas recirculation passage to be an optimum amount in accordance with an engine operation condition;

fresh air amount detection means for detecting an amount of fresh air introduced into the engine intake system during a fuel-cut; and an estimation means for estimating an amount of particulates trapped by the particulate trap on the basis of the amount of fresh air detected by the fresh air detection means after the control valve is opened to a predetermined opening degree.

According to the present invention, there is provided another device for purifying exhaust gas of an internal combustion engine invention comprising:

a particulate trap disposed in the engine exhaust system;

an exhaust gas recirculation passage communicating the upstream side of the particulate trap in the engine exhaust system with the engine intake system;

a control valve for controlling the amount of exhaust gas recirculated through the exhaust gas recirculation passage to be an optimum amount in accordance with an engine operation condition;

a pressure differential detection means for detecting directly or indirectly a pressure differential between the upstream side and the downstream side of the particulate trap during a fuel-cut after the control valve is fully closed and a throttle valve disposed on the engine intake system is fully opened;

an estimation means for estimating an amount of particulate trapped by the particulate trap on the basis of the pressure differential detected by the pressure differential detection means.

The present invention will be more fully understood from the description of preferred embodiments of the invention set forth below, together with the accompanying drawings.

BRIEF DESCRIPTION OF THE DRAWINGS

In the drawings:

FIG. 19 is a sixteenth flowchart for updating the correction coefficient used in the fifteenth flowchart.

DESCRIPTION OF THE PREFERRED EMBODIMENTS

Figure 1:
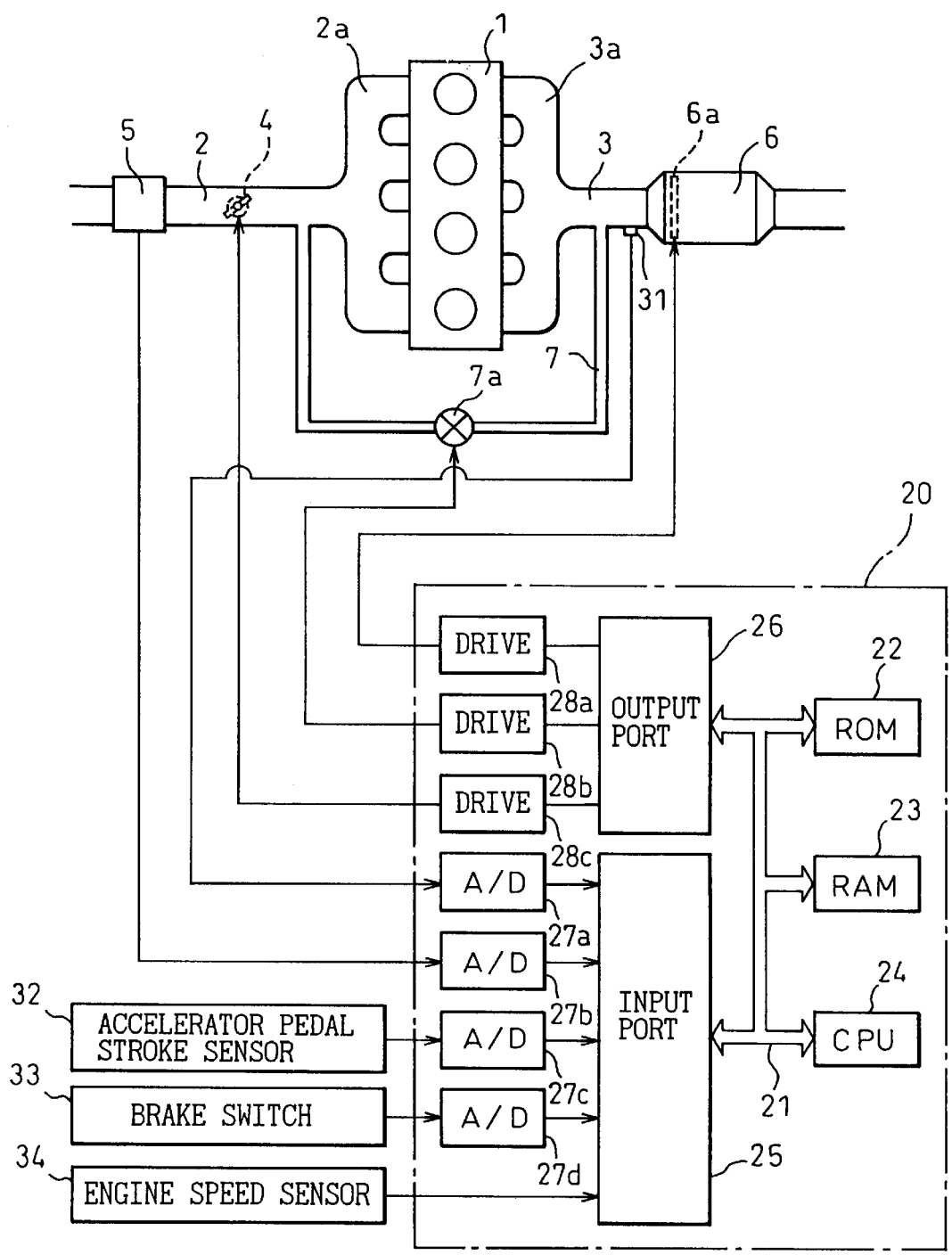
FIG. 1 is a view schematically illustrating a device for purifying exhaust gas of an internal combustion engine according to an embodiment of the present invention.

FIG. 1 is a view schematically illustrating a device for purifying exhaust gas of an internal combustion engine according to an embodiment of the present invention. In FIG. 1, reference numeral 1 denotes an engine body, 2 denotes an engine intake system, and 3 denotes an engine exhaust system. In the engine intake system 2, a throttle valve 4 is disposed on the upstream side of an intake manifold 2a connected to the cylinders, and an air flow meter 5 is disposed on the upstream of the throttle valve 4 to detect an amount of the fresh intake air introduced into the engine intake system 2. The upstream side of the air flow meter 5 is open to the atmosphere via an air cleaner. In this embodiment, the throttle valve 4 is not mechanically driven by being interlocked to the accelerator pedal, but is freely set for its opening degree by using a step motor or the like means.

In the engine exhaust system 3, on the other hand, a particulate trap 6 is disposed on the downstream side of the exhaust manifold 3a connected to the cylinders. The downstream side of the particulate trap 6 is open to the atmosphere via a catalytic converter and a silencer.

A portion between the intake manifold 2a and the throttle valve 4 in the engine intake system is communicated, through an exhaust gas recirculation passage 7, with a portion between the exhaust manifold 3a and the particulate trap 6 in the engine exhaust system. In the exhaust gas recirculation passage 7, a control valve 7a for controlling the recirculating amount of exhaust gas to an optimum amount in accordance with an engine operating condition is disposed.

The particulate trap 6 is a porous particulate trap made from a porous material such as a ceramic. The particulate trap has plural longitudinal spaces that are subdivided by partition walls extending longitudinally. In any two longitudinal spaces that are adjacent each other, blocking members made from a ceramic one longitudinal space on the exhaust gas upstream side and the other longitudinal space on the exhaust gas downstream side. Thus, the two longitudinal spaces that are adjacent each other form a trap passage in which the exhaust gas flows from the upstream side to the downstream side through the partition wall, and the partition walls made from a porous material work as a trap wall to trap the particulates when the exhaust gas passes therethrough.

Further, the particulate trap 6 may be a metallic fiber particulate trap comprising heat-durable metallic fiber nonwoven sheets and heat-durable metal corrugated plates. The particulate trap is constructed by two nonwoven sheets and two corrugated plates alternately overlaid with each other in the thickness direction in a spiral manner, and has plural longitudinal spaces between the nonwoven sheets and the corrugated plates. The heat-durable metallic fiber composing the nonwoven sheet and the heat-durable metal forming the corrugated plate may be, for example, an alloy of Fe—Cr—Al or Ni—Cr—Al. In the two nonwoven sheets, one surface of one nonwoven sheet and one surface of the other sheet are in close contact and are continuously welded, in a spiral manner, to each other along the upstream edges thereof, and the other surface of one nonwoven sheet and the other surface of the other nonwoven sheet are in close contact and are continuously, welded in a spiral manner, to each other along the downstream edges thereof. Thus, the two longitudinal spaces that are radially adjacent each other become a trap passage in which the exhaust gas flows from the upstream side to the downstream side through either nonwoven sheets, and the nonwoven sheets work as a trap wall to trap the particulates when the exhaust gas passes therethrough.

When an amount of particulate trapped by such a particulate trap 6 becomes large, the exhaust gas resistance increases and the engine output greatly decreases. It therefore becomes necessary to regenerate the particulate trap itself by burning the particulate when an appropriate amount of particulate is trapped.

For this purpose according to this embodiment, a heater 6a is disposed in the particulate trap, and it becomes necessary to determine the timing for regeneration to energize the heater 6a. As means for regenerating the particulate trap, an oxidation catalyst or the like may be disposed in the particulate trap and the unburned fuel may be supplied to the oxidation catalyst at the time for regeneration.

Figure 2:
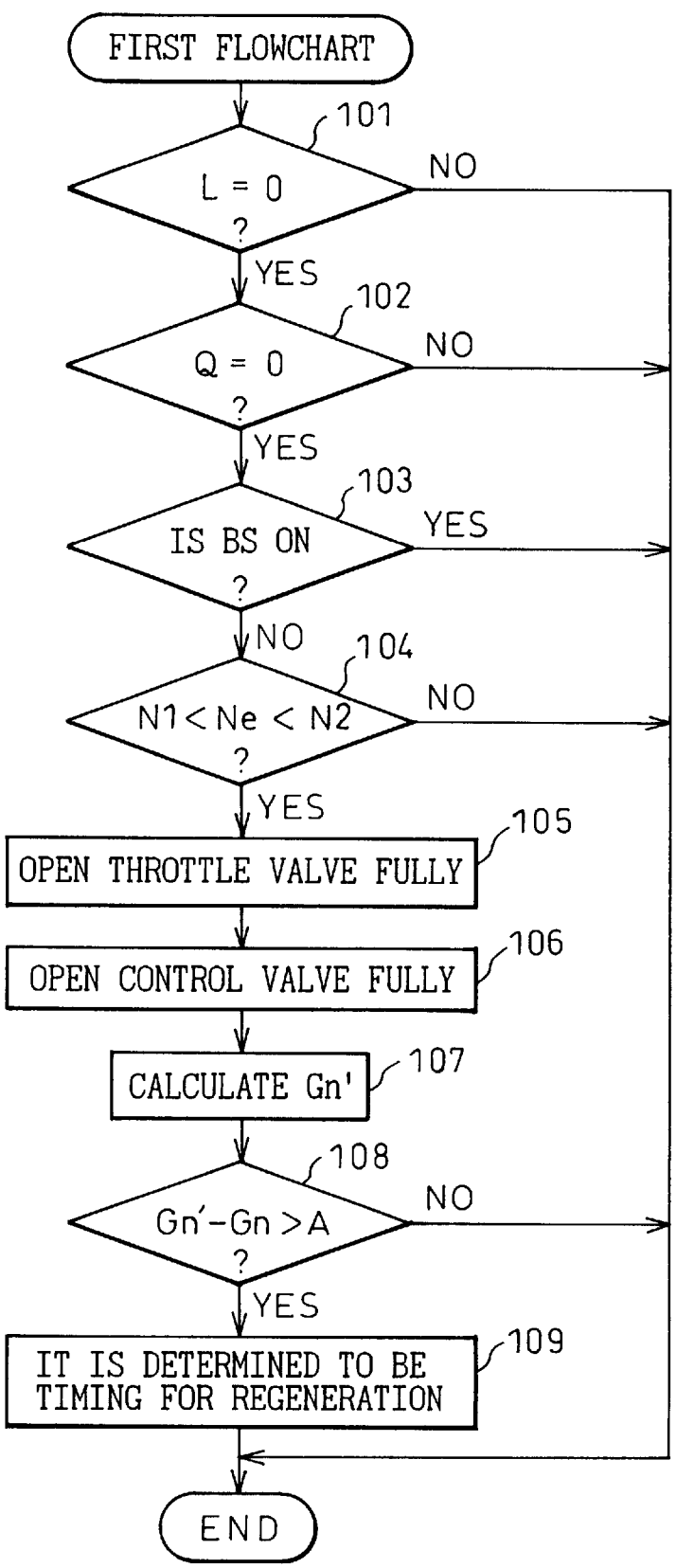
FIG. 2 is a first flowchart for determining the timing for regeneration.

It is undesirable that the timing for regeneration be determined either too early or too late; i.e., it is necessary to correctly determine that an appropriate amount of particulate has been trapped. In this embodiment, an amount of particulate trapped by the particulate trap is estimated and the timing for regeneration is determined by a control unit 20 according to a first flowchart shown in FIG. 2.

The control unit 20 is an electronic control unit constructed as a digital computer. The control unit 20 includes a ROM (read only memory) 22, a RAM (random access memory) 23, a CPU (microprocessor. etc.) 24, an input port 25, and an output port 26, which are interconnected by a bidirectional bus 21. The air flow meter 5 is connected to the input port 25 via an AD converter 27*b*. A temperature sensor 31, which detects an exhaust gas temperature immediately upstream of the particulate trap 6, is connected to the input port 25 via an AD converter 27*a*. An accelerator pedal stroke sensor 32, which detects a depressed amount of the accelerator pedal as an engine load, is connected to the input port 25 via an AD converter 27*c*. A brake switch 33, which is turned ON when the brake pedal is depressed, is connected to the input port 25 via an AD converter 27*d*. An engine speed sensor 34, which detects an engine speed, is connected to the input port 25. On the other hand, the throttle valve 4 is connected to the output port 26 via a drive circuit 28*c*. The control valve 7*a* is connected to the output port 26 via a drive circuit 28*b*. The heater 6*a* is connected to the output port 26 via a drive circuit 28*a*. The first flowchart is explained as follows.

At step 101, first, it is determined if a depressed amount L of the accelerator pedal detected by the accelerator pedal stroke sensor (32) is 0. When this determination is false, the accelerator pedal has been depressed, i.e., the engine is in operation, and it is not possible to estimate an amount of trapped particulate. Therefore, the routine ends.

When this determination is true, i.e., when the accelerator pedal has not been depressed, on the other hand, the routine proceeds to a step 102 where it is determined if the current fuel injection amount Q is zero. When this determination is false, the fuel is injected and the engine is in operation. It is not therefore allowed to estimate an amount of trapped particulate, and the routine ends.

When the determination is true at step 102, however, the routine proceeds to step 103 where it is determined if the brake switch 33 (BS) is turned on. When this determination is true, therefore, no fuel has been injected, i.e., a fuel-cut has been carried out, and the engine speed may greatly change due to the application of the brake. This case, therefore, is not suited for correctly estimating an amount of trapped particulate, and the routine ends.

When the determination at step 103 is false, on the other hand, the routine proceeds to step 104 where it is determined if a current engine speed Ne lies within a predetermined range. The predetermined range is, for example, from 1000 rpm to 2000 rpm. When the current engine speed is smaller than 1000 rpm, it is likely that the idle engine speed may soon be assumed to start the fuel injection again. When the engine speed is as high as 2000 rpm or more, i.e., when the piston descends at a high speed, there takes place a delay in the intake air, and a decreased amount of the air is taken in each cylinder. When the current engine speed Ne does not lie within the predetermined range, therefore, the condition is not suited for correctly estimating an amount of trapped particulate, and the routine ends.

When the current engine speed Ne lies within the predetermined range at step 104, however, the routine proceeds to step 105 to estimate an amount of trapped particulates and where the throttle valve 4 is fully opened or nearly fully opened. Then, at step 106, the control valve 7*a* is fully opened or nearly fully opened. At step 107, a reference intake air amount Gn' that should be taken in each cylinder is calculated based on the current engine speed Ne. Of course, it is allowable to store the reference value Gn' in the form of a map for every engine speed Ne.

Next, at step 108, it is determined if a predetermined value A is exceeded by a difference between the reference value Gn' calculated at step 107 and a practical fresh intake air amount Gn detected by the air flow meter 5. When this determination is false, it is not the timing for regeneration and the routine ends. When the determination at step 108 is true, on the other hand, it is determined at step 109 that it is the timing for regeneration, and the heater 6*a* arranged in the particulate trap 6 is energized to execute the regeneration treatment.

It has heretofore been known that the amount of the fresh intake air decreases with an increase in the amount of trapped particulate. According to a prior art, therefore, a case where the practical amount of the fresh intake air has dropped down to, for example, 80% of the reference amount of the fresh intake air of when the particulate matter has not been trapped at all, is determined to be a timing for regeneration based on the assumption that an appropriate amount of particulate has been trapped by the particulate trap.

According to this determination, however, the recirculation of exhaust gas must be interrupted causing NOx to be produced in increased amounts during the normal engine operation. In theory, the determination can be rendered when the fuel-cut is carried out to interrupt the combustion irrespective of the amount of NOx that is produced. However, the reference value itself is so small that the practical amount of fresh intake air which becomes 80% of the reference value creates only a small difference, and it is not considered that the timing for regeneration has been correctly determined if an error in the measurement is taken into consideration.

In this embodiment, on the other hand, the control valve 7*a* in the exhaust gas recirculation passage 7 is fully opened at the time when the fuel-cut is carried out. If no particulates have been trapped by the particulate trap 6, the pressure is nearly equal between the downstream of the throttle valve 4 in the engine intake system 2 and the upstream of the particulate trap 6 in the engine exhaust system 6, and only a small amount of the gas passes through the exhaust gas recirculation passage 7 if it flows at all. Accordingly, the reference value Gn' becomes nearly equal to the practical amount Gn of the fresh intake air, and the determination is false at step 108.

However, when the particulate is trapped by the particulate trap 6 and the exhaust gas resistance increases, the pressure increases on the upstream side of the particulate trap 6 in the engine exhaust system 6, the gas starts recirculating into the engine intake system passing through the exhaust gas recirculation passage 7, and the more the amount of the gas increases, the more the amount of trapped particulate increases. Accordingly, the practical amount of the fresh intake air decreases with an increase in the exhaust gas resistance through the particulate trap 6, and decreases with an increase in the amount of the recirculation gas.

Thus, when the particulate is trapped in an appropriate amount by the particulate trap 6, there occurs a distinct difference between the reference value Gn' and the practical amount Gn of the fresh intake air. At step 108, therefore, it is allowed to use a relatively large value A, and the timing for regeneration can be correctly determined even if some degree of error is contained in the measurement. Here, the difference between the reference value Gn' and the practical amount Gn of the fresh intake air represents the amount of the particulate trapped by the particulate trap 6.

In determining the timing for regeneration based on the amount of trapped the particulate according to this embodiment, the throttle valve 4 is fully opened and the engine speed Ne lies within the predetermined range on the low engine speed side. Although this is not to limit the invention, this makes possible to set the reference fresh intake air amount Gn' to be a large value when no particulates have been trapped by the particulate trap 6, offering advantage in correctly detecting the amount of trapped particulate or in correctly determining the timing for regeneration. In determining the timing for regeneration based on the amount of trapped particulates, further, the control valve 7a disposed in the exhaust gas recirculation passage 7 is fully opened. Although this is not to limit the present invention, as the particulates are trapped by the particulate trap 6 so that the exhaust gas resistance increases, therefore, a relatively large amount of the gas is recirculated into the engine intake system, enabling the predetermined value A to be set to a large value offering an advantage in correctly determining the timing for regeneration. The predetermined value A may be varied in accordance with the engine speed.

In this embodiment, the difference between the reference value Gn' and the practical fresh intake air amount Gn is used as the trapped amount of particulates, and the timing for regeneration is determined when the difference has exceeded the predetermined value A. Of course, also, the ratio Gn/Gn' of the practical fresh intake air amount Gn to the reference value Gn' represents the amount of trapped particulates. The ratio value becomes 1 when the amount of trapped particulates is 0, and decreases with an increase in the trapped amount of particulates. Therefore, when the ratio value becomes a predetermined value (e.g., 0.6), i.e., when the practical fresh intake air amount Gn becomes 60% of the reference value Gn', it may be determined to be the time for regeneration. Here, the predetermined value 60% has resulted from the recirculation of the exhaust gas through the exhaust gas recirculation passage 7, which, however, is not to mean that the particulate trap is preventing the passage of the exhaust gas by 40% but means that the amount of the fresh intake air has drastically decreased compared to the prior art when an appropriate amount of the particulates has been trapped.

Figure 3:
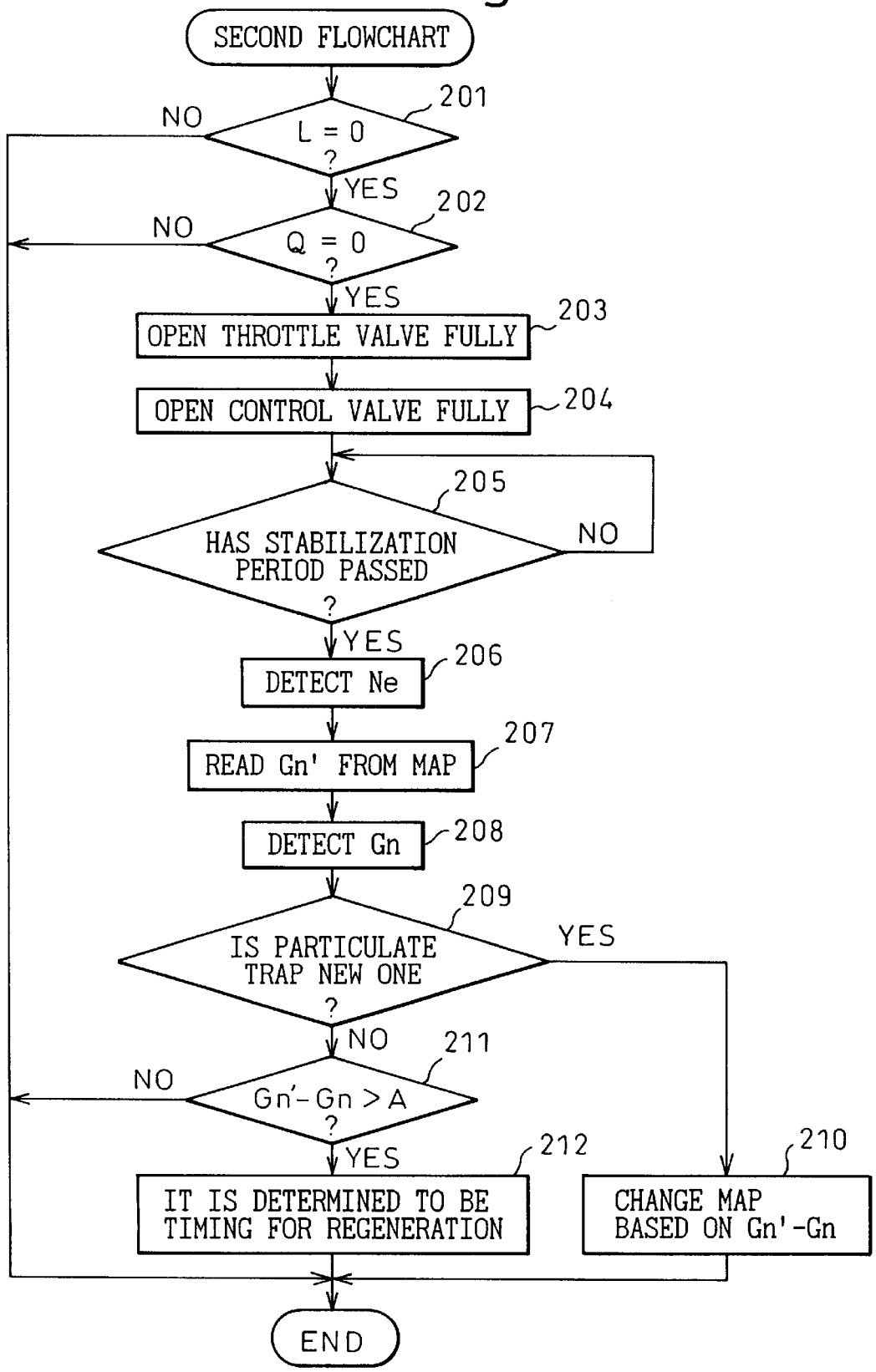
FIG. 3 is a second flowchart for determining the timing for regeneration.

FIG. 3 is a second flowchart for determining the timing for regeneration by estimating the amount of particulates trapped by the particulate trap, instead of using the first flowchart. Described below are the differences from the first flowchart. In this flowchart, when the fuel-cut is carried out, the throttle valve and the control valve are fully opened and the timing for regeneration is determined, irrespective of whether the brake switch is turned on or the engine speed Ne lies within the predetermined range. When the fuel-cut is carried out, however, the timing for regeneration is not determined until a stabilization period elapses at step 205 after the throttle valve and the control valve have been fully opened. The stabilization period is for eliminating the effect of the change in the opening degree of the throttle valve and of the control valve upon the amount of the fresh intake air.

Next, the engine speed Ne is detected at step 206, the reference fresh intake air amount Gn' is read from the map based on the engine speed Ne, and the practical fresh intake air amount Gn is detected at step 208. Then, it is determined at step 209 if the particulate trap 6 is a new one. When the particulate trap is used in engine operations for the first time, i.e., when the vehicle is new or when the particulate trap is renewed, the determination is true, and the routine proceeds to step 210 where Gn'-Gn corresponding to the trapped amount of the particulate is calculated.

When Gn' read out from the map is of a correct value, the trapped amount of the particulate is 0 where the particulate trap is new, and thus Gn'-Gn should be 0. When Gn'-Gn is not 0, however, it means that the map value is not correct. Therefore, the map is changed based on this value. This change may be effected for only the map value corresponding to the current engine speed Ne. However, it may changes all map values corresponding to other engine speeds at the same ratio. When the reference fresh intake air amount Gn' is to be calculated based on the engine speed without using the map, further, the coefficients used in the calculation formulas may be changed based on the value Gn'-Gn so that the reference value can be correctly calculated. Thus, the amount of trapped particulate can be estimated more correctly.

When the particulate trap is no longer new, the timing for regeneration is determined at step 211 and at subsequent steps based on the value Gn'-Gn corresponding to the amount of trapped particulates as in the first flow chart.

Figure 4:
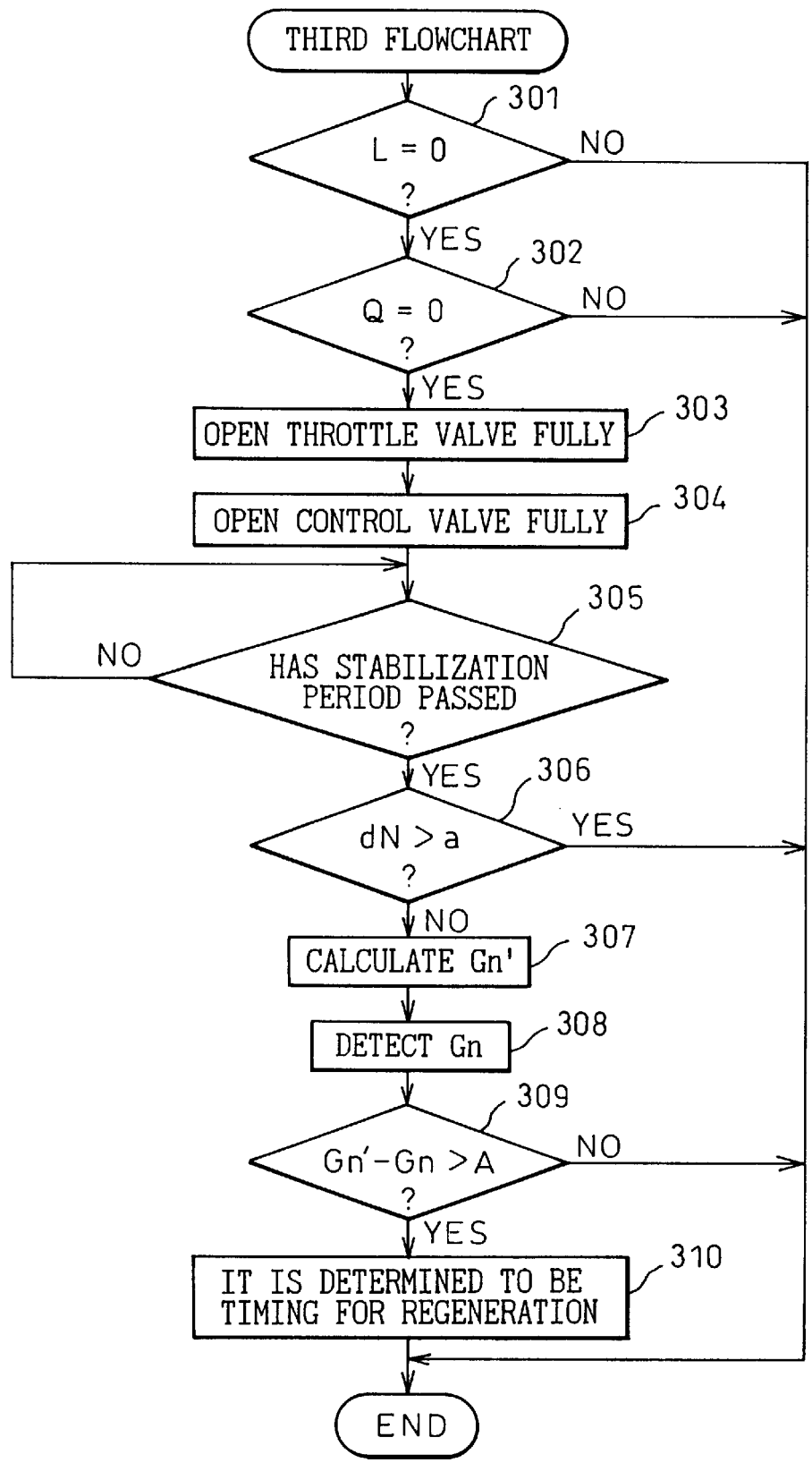
FIG. 4 is a third flowchart for determining the timing for regeneration.

FIG. 4 is a third flowchart for determining the timing for regeneration by estimating the amount of particulates trapped by the particulate trap. Described below are differences from the first flowchart. In this flow chart, when the fuel-cut is carried out, the throttle valve and the control valve are fully opened to determine the timing for regeneration irrespective of whether the brake switch is turned on or whether the engine speed Ne is within the predetermined range. After the passage of the stabilizing period like in the second flowchart, however, it is determined at step 306 if the change dN in the engine speed per a unit time is greater than a preset value a. When this determination is false, the timing for regeneration is determined based on the trapped amount of particulates as in the first flowchart.

When the determination is true at step 306, on the other hand, it means that there is taking place a great change in the engine speed because of such reasons that the brake pedal was depressed, clutch pedal was depressed, or the gear ratio was shifted in the transmission. The fresh air amount Gn that is practically detected lacks stability, and it is not possible to correctly estimate the amount of trapped particulates, and the routine ends. It is thus possible to more correctly estimate the amount of trapped particulate.

Figure 5:
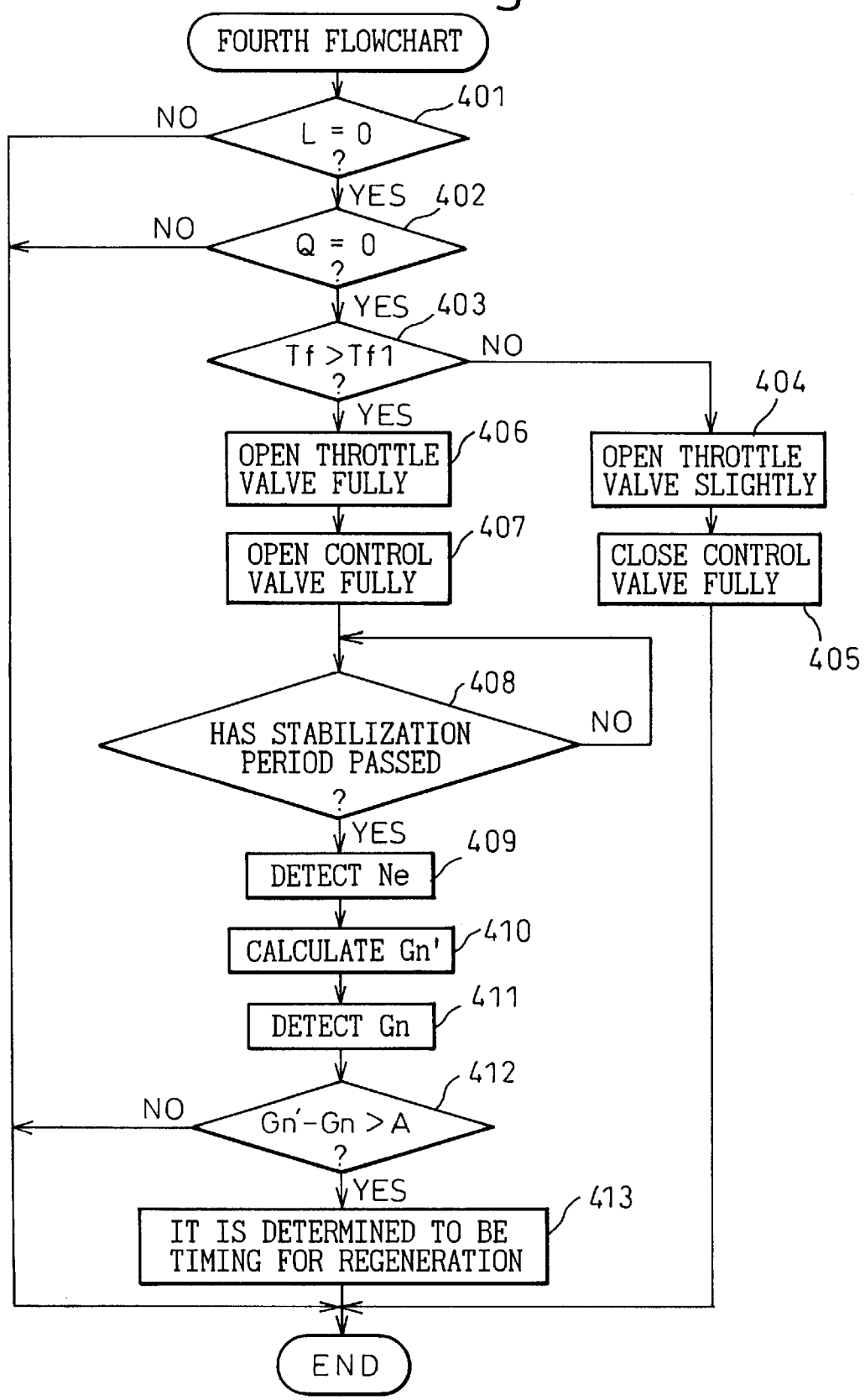
FIG. 5 is a fourth flowchart for determining the timing for regeneration.

FIG. 5 is a fourth flow chart for determining the timing for regeneration by estimating the amount of particulates trapped by the particulate trap. Described below are differences from the first flowchart. In this flow chart, when the fuel-cut is carried out, the throttle valve and the control valve are fully opened to determine the timing for regeneration irrespective of whether the brake switch is turned on or whether the engine speed Ne is within the predetermined range. However, it is determined at step 403 whether a preset temperature Tf1 is exceeded by the temperature Tf of the particulate trap that is estimated based on the temperatures of the exhaust gas flowing into the particulate trap and the flow rates thereof up to this time, in addition to determining the timing for regeneration after the stabilizing period has passed as is done in the second flowchart. When this determination is true, the timing for regeneration is determined as in the first flowchart. Here, the temperatures of exhaust gas are detected by the temperature sensor 31, and the flow rates thereof are the same as those of the fresh intake air detected by the air flow meter 5.

When the determination at step 403 is false, however, the throttle valve is opened to a small degree at step 404, and the control valve is fully closed at step 405 in order not to determine the timing for regeneration. In a state where the determination is false at step 403, i.e., where the temperature of the particulate trap is low, if the throttle valve is fully opened to let the unburned exhaust gas of a low temperature pass in large amounts through the particulate trap to determine the timing for regeneration, then, the temperature of the particulate trap further decreases, and the trapped particulates are hardened and becomes difficult to burn out in the above-mentioned regeneration treatment. In this flow chart, when the temperature of the particulate trap is low, determination of the timing for regeneration is inhibited, the throttle valve is opened to a small degree while the control valve is fully closed, permitting the exhaust gas of a low temperature to flow in a decreased amount through the particulate trap, so that the trapped particulate will not be hardened. In this flowchart, the temperature of the particulate trap is estimated from the exhaust gas flowing into the particulate trap. It is, however, also allowable to directly measure the temperature of the particulate trap, as a matter of course.

Figure 6:
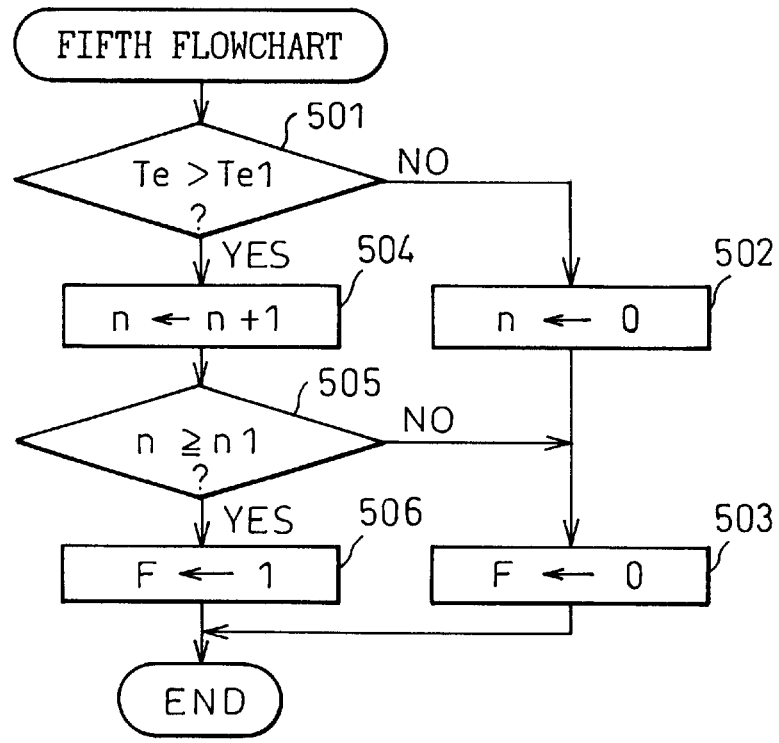
FIG. 6 is a fifth flowchart for determining if the flowchart for determining the timing for regeneration be executed.

FIG. 6 is a fifth flowchart for determining if the above-mentioned flowcharts for determining the timing for regeneration be executed. At step 501, first, it is determined if the exhaust gas temperature Te in the current engine operating condition is higher than a preset temperature Te1. When this determination is false, the counted value n is reset to 0 at step 502, an execution permission flag F is set to 0 at step 503, and it is permitted that the above-mentioned flowchart is executed for determining the timing for regeneration.

When the determination at step 501 is true, on the other hand, i.e., when the exhaust gas temperature Te in the current engine operating condition is very high, the routine proceeds to step 504 where the counted value n is increased by 1 and at step 505, it is determined if the counted value n is larger than a setpoint value n1. When this determination is false, the execution permission flag F is set to 0 at step 503. When the counted value n is larger than the preset value n1, i.e., when the engine operating condition, in which continues for a relatively long period the exhaust gas temperature Te is made high, the execution permission flag F1 is set to 1 at step 506 presuming that the trapped particulate has burnt out automatically and the particulate trap is regenerated, and it is not permitted that the above-mentioned flowchart for determining the timing for regeneration is executed.

When the particulate trap is thus regenerated, the determination of the timing for regeneration is not executed; i.e., the unburned exhaust gas of a low temperature is not unnecessarily passed through the particulate trap, and the temperature of the particulate trap does not drop. Accordingly, the particulate trap is maintained at a relatively high temperature and can be efficiently regenerated.

Figure 7:
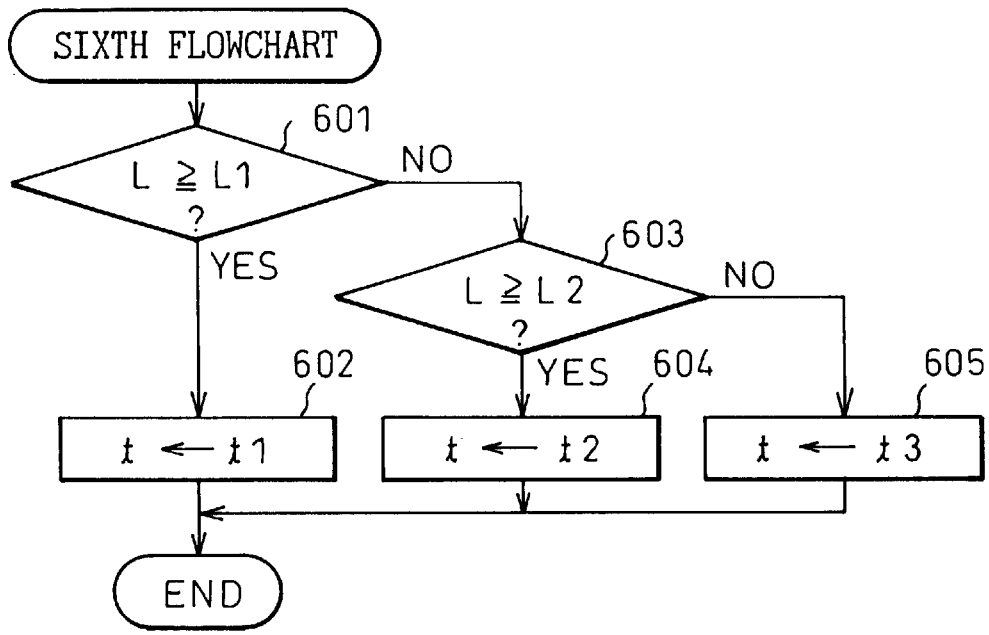
FIG. 7 is a sixth flow chart for changing the stabilization period.

FIG. 7 is a sixth flowchart for changing the stabilization period used in the above-mentioned flowcharts for determining the timing for regeneration. First, at step 601, it is determined if the depressed amount L of the accelerator pedal is larger than a first preset amount L1. When this determination is true, a relatively long period is required before the amount of the fresh intake air is stabilized. This is because, when the fuel-cut is carried out and the timing for regeneration is determined, the accelerator pedal is returned in large amounts causing a large change in the engine load. At step 602, therefore, the stabilizing period t is set to be a relatively long period t1.

When the determination is false at step 601, it is determined at step 603 if the depressed amount L of the accelerator pedal is larger than a second preset amount L2. When this determination is true, not so long a period of time is required before the amount of the fresh intake air is stabilized. This is because, when the fuel-cut is carried out and the timing for regeneration is determined, the accelerator pedal is not returned in so large an amount and thus only a small change in the engine load is caused. At step 604, therefore, the stabilizing period t is set to be a relatively short period t2.

When the determination is false at step 603, the depressed amount L of the accelerator pedal is small and the amount of the fresh intake air is stabilized within a short period. This is because, when the fuel-cut is carried out and the timing for regeneration, is determined the accelerator pedal is slightly returned and thus a change in the engine load is not almost caused. At step 605, therefore, the stabilizing period t is set to be a very short period t3.

Upon repeating the operation, the stabilization period is set depending upon the depressed amount of the accelerator pedal of just before determining the timing for regeneration. Therefore, the determination of the timing for regeneration is not unnecessarily lengthened, and the temperature of the particulate trap is prevented from being unnecessarily lowered accompanying passage of the low temperature exhaust gas. In this flowchart, the stabilization period is set in three stages depending upon the depressed amount of the accelerator pedal. If is, of course, possible to more finely divide the depressed amount of the accelerator pedal to more finely set the stabilization period.

Figure 8:
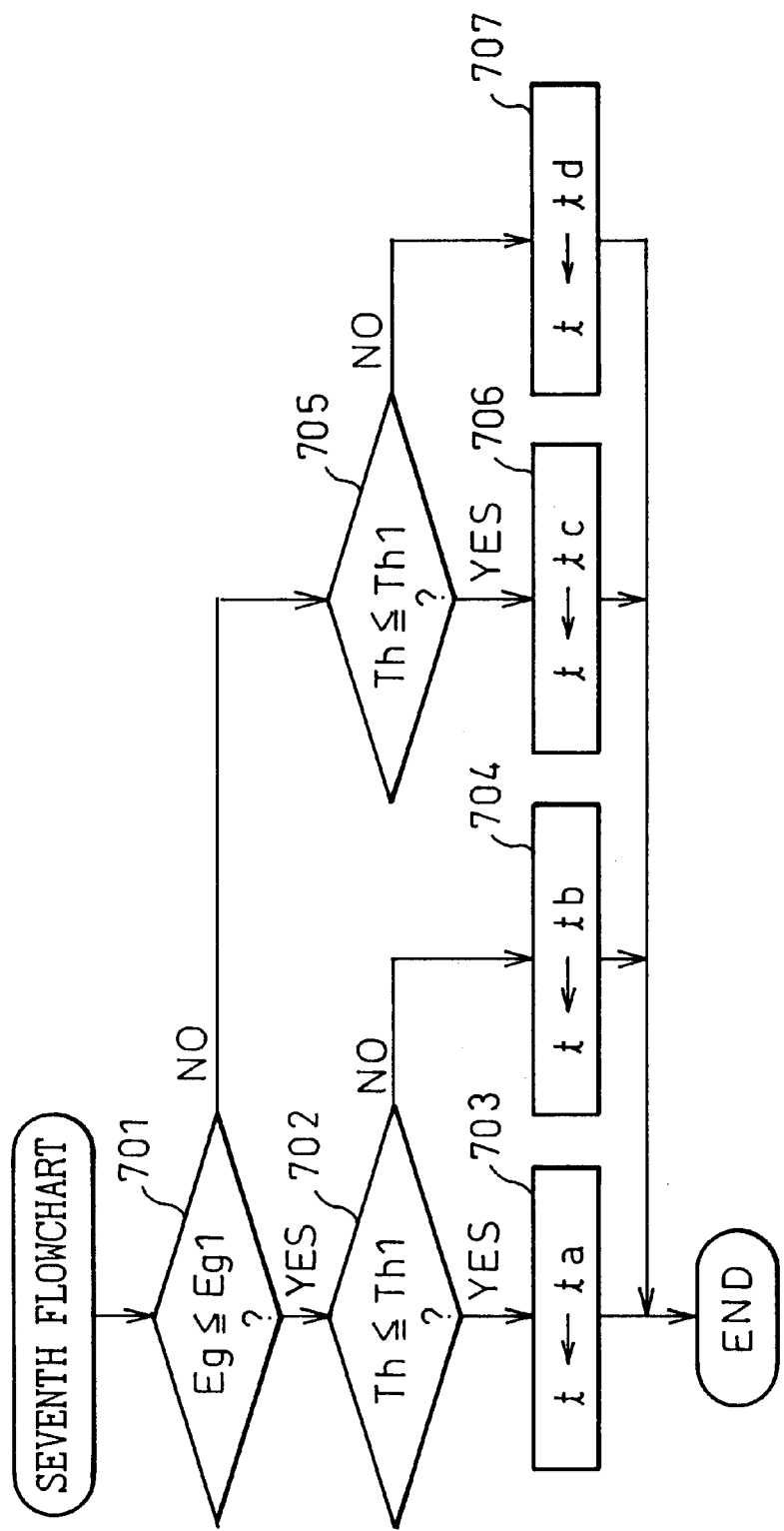
FIG. 8 is a seventh flowchart for changing the stabilizing period.

FIG. 8 is a seventh flowchart for changing the stabilization period, instead of using the sixth flow chart. At step 701, first, it is determined if the opening degree Eg of the control valve is not larger than a preset opening degree Eg1. When this determination is true, it is determined at step 702 if the opening degree Th of the throttle valve is not larger than a preset opening degree Th1. When this determination is true, i.e., when the opening degree Eg of the control valve and the opening degree Th of the throttle valve are both small, a relatively long period is required before the amount of the fresh intake air is stabilized. This is because, when the fuel-cut is carried out, and the timing for regeneration is determined, the control valve and the throttle valve are opened up to their fully opened state. At step 703, therefore, the stabilization period t is set to be a relatively long period ta.

When the determination is false at step 702, the opening degree Eg of the control valve is small but the opening degree Th of the throttle valve is relatively large, and not so long a period of time is required before the amount of the fresh intake air is stabilized. This is because, when the fuel-cut is carried out and the timing for regeneration is determined, the control valve must be opened up to its fully opened state but the throttle valve needs be opened by only a small amount to reach its fully opened state. At step 704, therefore, the stabilization period t is set to be a relatively short period of time tb.

When the determination is false at step 701, further, it is determined at step 705 if the opening degree Th of the throttle valve is not larger than a preset opening degree Th1. When this determination is true, the opening degree Eg of the control valve is relatively large but the opening degree Th of the throttle valve is small, and not so long a period of time is required before the amount of the fresh intake air is stabilized. This is because, when the fuel-cut is carried out and the timing for regeneration is determined, the throttle valve must be opened up to its fully opened state, but the control valve need only be opened by a small amount up to its fully opened state. At step 706, therefore, the stabilization period t is set to be a relatively short period tc. The amount of the fresh intake air is directly affected more by a change in the opening degree of the throttle valve than by a change in the opening degree of the control valve. It is therefore desired that a preset time tc at step 706 is longer than a setpoint time tb at step 704.

When the determination is false at step 705, further, both the opening degree Eg of the control valve and the opening degree Th of the throttle valve are large, and the amount of the fresh intake air is stabilized within a short period of time. This is because, when the fuel-cut is carried out and the timing for regeneration is determined, the control valve and the throttle valve need only be opened by small amounts to their fully opened states. At step 707, therefore, the stabilization period t is set to be a very short period td.

According to this flowchart as described above, the stabilization period is set depending upon the opening degrees of the control valve and of the throttle valve just before determining the timing for regeneration. Therefore, the determination of the timing for regeneration is not unnecessarily lengthened, and the temperature of the particulate trap is prevented from being unnecessarily lowered accompanying passage of the low temperature exhaust gas. In this flowchart, too, the stabilization period may be set in a multiplicity of stages by more finely dividing the opening degrees of the control valve and of the throttle valve. Besides, this flowchart and the sixth flowchart may be combined together to set a stabilization period.

Figure 9:
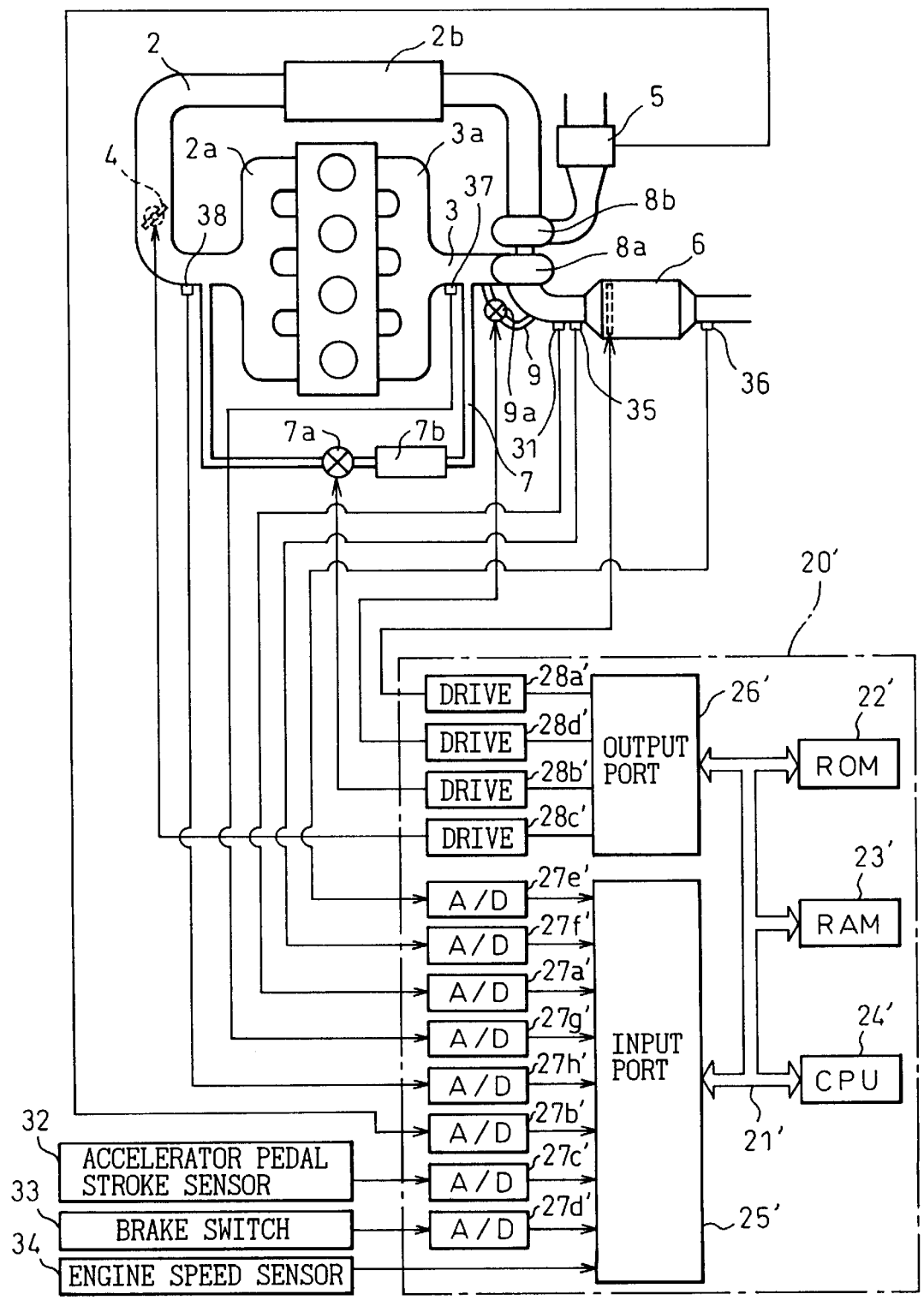
FIG. 9 is a view schematically illustrating a device for purifying exhaust gas of an internal combustion engine according to another embodiment of the present invention.

FIG. 9 is a view schematically illustrating the device for purifying exhaust gas of an internal combustion engine according to another embodiment of the present invention. Described below are only the differences from the embodiment shown in FIG. 1. In this embodiment, the exhaust gas recirculation passage 7 is provided with an exhaust gas cooler 7b for cooling the recirculating exhaust gas to be able to recirculate a large amount of the exhaust gas. A turbine 8a of a turbo charger is provided between a portion where the exhaust gas recirculation passage 7 is connected to the engine exhaust system 3 and the particulate trap 6, and a compressor 8b of the turbo charger is provided between the throttle valve 4 and the air flow meter 5 in the engine intake system 2. Further, the engine intake system 2 is provided with an intake air cooler 2b for cooling the fresh air to be able to introduce large amounts of the fresh air into the cylinders.

A bypass passage 9 is provided so as to bypass the turbine 8a downstream of the portion where the exhaust gas recirculation passage 7 is connected to the engine exhaust system 3. A waste gate valve 9a is arranged in the bypass passage 9 to control an amount of exhaust gas passing through the turbine 8a and to control the rotational speed of the turbine 9. The control unit 20' is an electronic control unit as same as that of the embodiment in FIG. 1, and further has a drive circuit 28d' to control the waste gate valve 9a. A first pressure sensor 35 that detects an exhaust gas pressure immediately upstream the particulate trap 6 is provided and is connected to the input port 25' via an A/D converter 27f'. A second pressure sensor 36 that detects an exhaust gas pressure immediately downstream of the particulate trap 6 is connected to the input port 25' via an A/D converter 27e'. A first gas temperature sensor 37 that detects a gas temperature, near the portion where the exhaust gas recirculation passage 7 is connected to the engine exhaust system 3, is provided and is connected to the input port 25' via an A/D converter 27g. A second gas temperature sensor 38, that detects a gas temperature near the portion where the exhaust gas recirculation passage 7 is connected to the engine intake system 3, is connected to the input port 25' via an A/D converter 27h'.

Figure 10:
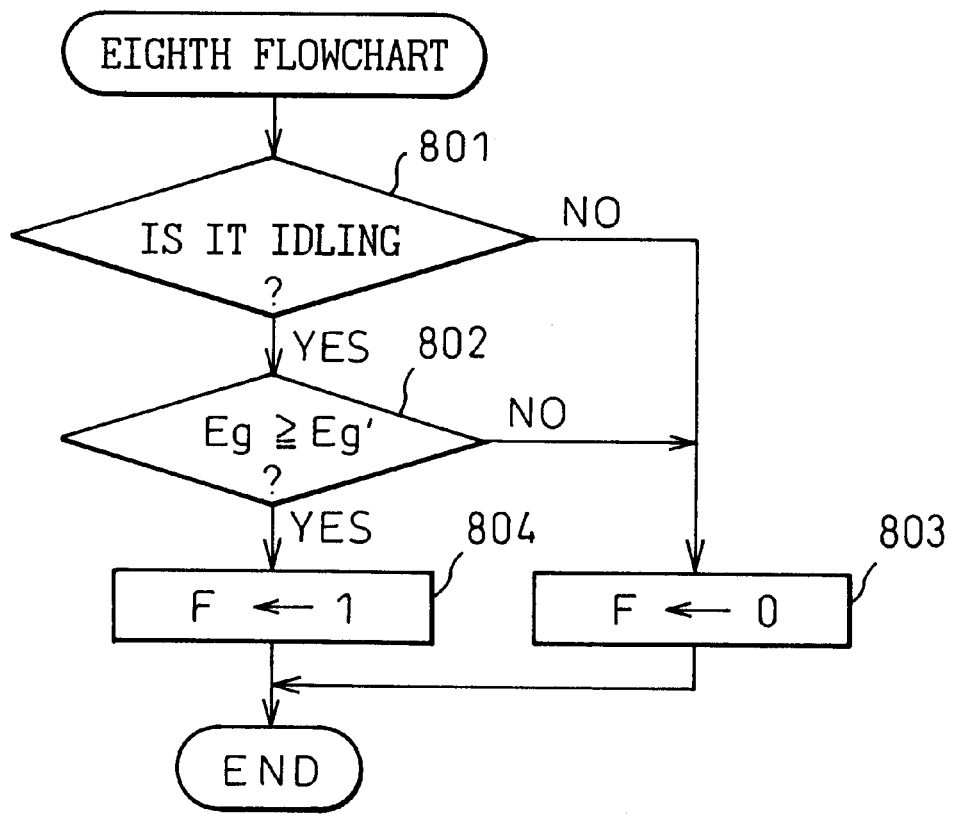
FIG. 10 is an eighth flowchart for determining if the flowchart for determining the timing for regeneration be executed.

FIG. 10 is an eighth flowchart for determining if the above-mentioned flowcharts for determining the timing for regeneration be executed relying upon the gas flow resistance through the exhaust gas recirculation passage. At step 801, first, it is determined if the current engine operating condition is an idle condition. When this determination is true, it is determined at step 802 if the opening degree Eg of the control valve 7a is greater than a setpoint opening degree Eg'.

During the idle condition, it is necessary to supply a desired amount of the fresh air into the cylinder to realize stable combustion. For this purpose, the control valve 7a is controlled by feedback. That is, when the amount of the fresh air detected by the air flow meter 5 is small relative to a predetermined opening degree of the throttle valve, the opening degree of the control valve 7a is decreased to decrease the amount of the recirculating exhaust gas and to increase the amount of the fresh air. When the amount of the fresh air detected by the air flow meter 5 is large, the opening degree of the control valve 7a is increased to increase the amount of the recirculating exhaust gas and to decrease the amount of the fresh air.

During the idle condition, when the gas flow resistance through the exhaust gas recirculation passage 7 is as low as that of when the new one is used, the control valve 7a is controlled by feedback by small amounts near a predetermined opening degree. Unlike the engine intake system 2 through which the fresh air flows, in the exhaust gas recirculation passage 7 through which the exhaust gas flows, however, it is likely that the particulates will adhere onto the control valve 7a causing the gas flow resistance to increase to a considerable degree. In the embodiment shown in FIG. 9, the exhaust gas recirculation passage 7 is provided with the exhaust gas cooler 7b, and the particulates may adhere onto the exhaust gas cooler 7b, too. Thus, when the gas flow resistance through the exhaust gas recirculation passage 7 increases to a considerable degree, the amount of recirculated exhaust gas becomes very small and the amount of the fresh air increases during the idle condition. Accordingly, the control valve 7a is opened to a very large degree, being controlled by feedback. When the determination is true at step 802, therefore, it means that the gas flow resistance has become very high through the exhaust gas recirculation passage 7.

In determining the timing for regenerating the above-mentioned particulate trap, it is a prerequisite that the gas flow resistance through the exhaust gas recirculation passage 7 is as low as that of when the new one is used. Therefore, when the determination is false at step 802, i.e., when the gas flow resistance through the exhaust gas recirculation passage 7 is very high, it is not possible to determine the timing for regeneration relying upon a correctly estimated amount of the trapped particulate. At step 804, therefore, the execution permission flag F is set to 1, and the flowchart for determining the timing for regeneration does not execute. When the determination is false at steps 801 and 802, on the other hand, it is not determined that the gas flow resistance is very high through the exhaust gas recirculation passage 7. Therefore, the execution permission flag F is set to 0 at step 803, and the flowchart for determining the timing for regeneration executes.

In this flowchart, it is determined that the gas flow resistance is becoming very high through the exhaust gas recirculation passage 7 during the idle condition. It is, of source, allowable to judge that the gas flow resistance through the exhaust gas recirculation passage 7 is becoming very high based on the same idea as that used during the idle condition even under ordinary operating conditions other than the idle condition. Strictly speaking, however, this determination requires that the gas flow resistance through the particulate trap must be low and constant. To minimize the effect of change in the amount of the particulate trapped by the particulate trap, therefore, it is desired to determine the gas flow resistance through the exhaust gas recirculation passage 7 during the idle condition where the amount of the exhaust gas is small.

When the gas flow resistance becomes very high through the exhaust gas recirculation passage 7, the vehicle must be brought to a repair shop to have the exhaust gas recirculation passage 7 cleaned or renewed, since there is no means for regenerating the exhaust gas recirculation passage 7. While the vehicle is being brought to a repair shop, it may arrive actually at the timing for regenerating the particulate trap. When the gas flow resistance through the exhaust gas recirculation passage 7 becomes very high, therefore, the timing for regeneration may be determined while the vehicle is being brought to a repair shop, instead of inhibiting the determination of the timing for regenerating the particulate trap, and the regeneration treatment may be executed while the vehicle is being brought to a repair shop, when the timing for regeneration is determined even though it may not be correct.

Figure 11:
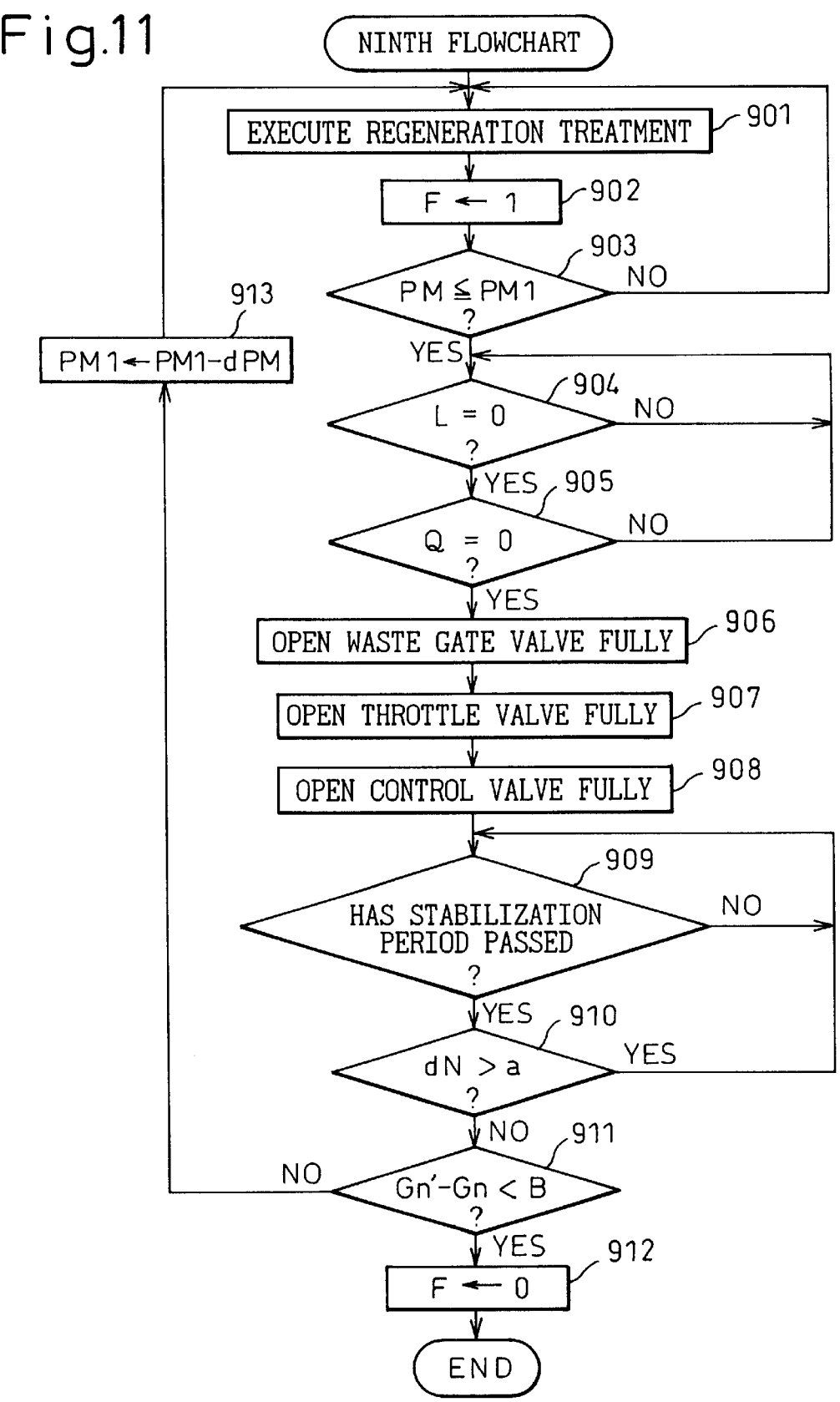
FIG. 11 is a ninth flowchart for determining the completion of regeneration.

FIG. 11 is a ninth flowchart for executing the regeneration treatment when it is determined that it is a timing for regenerating the particulate trap relying on the above-mentioned flowcharts for determining the timing for regeneration. At step 901, first, the regeneration treatment is executed. Then, at step 902, the execution permission flag F is set to be 1, and the flowchart for determining the timing for regeneration is not permitted to execute. When the timing for regeneration is to be determined as described earlier, the fuel-cut is carried out and a low temperature exhaust gas flows in large amounts through the particulate matter trap. Therefore, the temperature of the trapped particulate drops and it becomes difficult to regenerate the particulate trap. During the regeneration treatment, therefore, it is not permitted to determine the timing for regeneration.

Next, at step 903, it is determined if the amount PM of particulate trapped by the particulate trap has become smaller than a preset amount PM1. The amount of the particulate burnt out per a unit time in the regeneration treatment is regarded to be a minus value, the amount of the particulate exhausted from the combustion chamber per a unit time based on the current engine speed and the depressed amount of the accelerator pedal as an engine load, is regarded to be a plus value, and these values are added up to the amount of trapped particulate at a moment when the regeneration treatment is started in order to calculate the amount PM of trapped particulate.

The regeneration treatment continues until the determination becomes true at step 903. When the determination becomes true at step 903, it is presumed in calculation that the regeneration of the particulate trap is completed. At step 904, then, it is determined if the depressed amount L of the accelerator pedal is 0, and there is executed the same treatment as the determination of the timing for regeneration of the third flowchart. However, this flowchart is for when a turbo charger turbine 8a is provided on the upstream of the particulate trap in the engine exhaust system 3. At step 906, the waste gate value 9a is fully opened, and the pressure differential between the upstream side and the downstream side of the turbine 8a is decreased, desirably, to zero. Thus, the practical amount of the fresh intake air is stabilized at an early time.

At step 911, it is determined if the difference between the reference intake air amount Gn' calculated based on the current engine speed or read out from the map and the practical fresh air amount Gn measured by the air flow meter, is smaller than a preset value B. When this determination is true, the reference intake air amount Gn' is nearly equal to the practical fresh air amount Gn. This means that the amount of trapped particulate is nearly zero, and the regeneration of the particulate matter trap is completed. At step 912, the execution permission flag F is set to be 0 to determine the timing for regeneration next time, and the flowchart for determining the timing for regeneration is permitted to execute.

When the determination is false at step 911, on the other hand, the particulate trap has not been regenerated to a sufficient degree. It is therefore presumed that the amount of trapped particulate is not properly determined at step 903, and the regeneration completion threshold value PM1 used at step 903 is decreased by a setpoint value dPM at step 913. The regeneration treatment is then executed again starting from step 901. Thus, the difference between the reference intake air amount estimated based on the engine speed and the practical fresh intake air amount, represents the amount of the particulate trapped by the particulate trap, and can be used not only for determining the timing for regeneration but also for determining the completion of the regeneration treatment as in this flowchart.

In this flowchart, when the turbine of the turbo charger is disposed on the upstream of the particulate trap, the waste gate valve is fully opened in order to stabilize the practical fresh intake air amount at an early time. This, however, is not to limit the present invention, as a matter of course. When the opening degree of the waste gate valve is changed while determining the completion of the regeneration treatment, however, the practical intake air amount is affected by a change in the load of the turbine. During the determination of the completion of the regeneration treatment, therefore, it is desired to fix the waste gate valve to, at least, a predetermined opening degree, so that the practical fresh intake air amount is affected only by a change in the gas flow resistance that varies depending upon the amount of the particulate trapped by the particulate trap. In this case, the reference intake air amount estimated relying upon the engine speed must be determined by taking the turbine load at this moment into consideration.

When the opening degree of the waste gate valve is changed while determining the completion of the regeneration treatment, the gas flow resistance of the particulate trap is affected even when the turbine of the turbo charger is disposed on the downstream of the particulate trap. In also this case, it is therefore desired that the waste gate valve is fixed to a predetermined opening degree or is fixed to be fully opened. The waste gate valve that is fixed to be fully opened or is fixed to a predetermined opening degree, is effective not only in determining the completion of the regeneration treatment but also in determining the timing for regeneration for stabilizing the practical fresh intake air amount in an early time.

Figure 12:
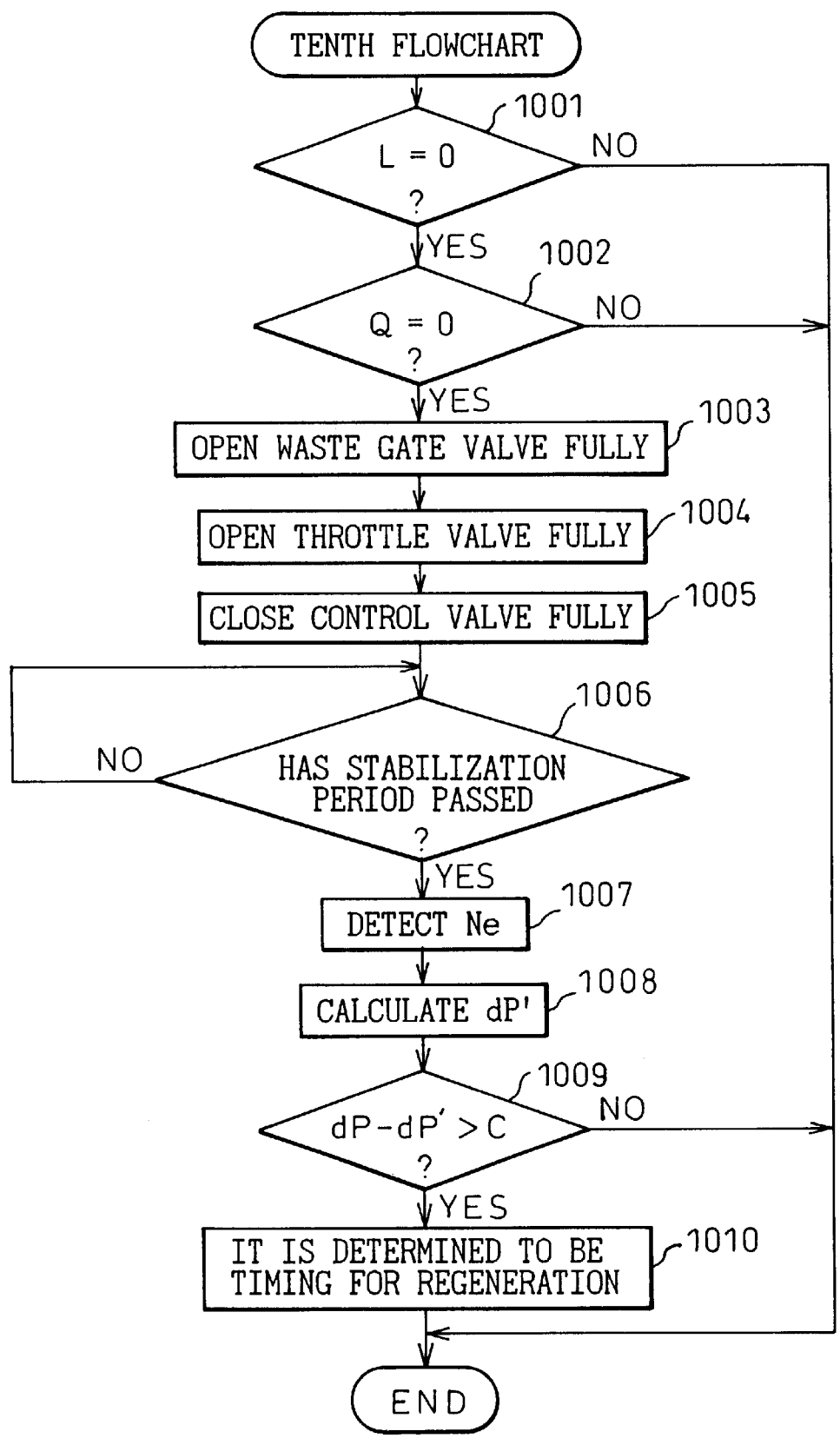
FIG. 12 is a tenth flowchart for determining the timing for regeneration.

FIG. 12 is a tenth flowchart for determining the timing for regeneration. According to this flowchart, unlike the above-mentioned flowcharts for determining the timing for regeneration, the waste gate valve and the throttle valve are fully opened when the fuel-cut is carried out, but the control valve is fully closed at step 1005 to halt the recirculation of the exhaust gas. Thus, the exhaust gas of an amount that varies in accordance with the engine speed Ne only is permitted to pass through the particulate trap. Even when the recirculation of the exhaust gas is halted, there occurs no problem such as an increase in the amount of produced NOx since the fuel-cut has been carried out. Then, at step 1008, it is presumed that no particulate has been trapped by the particulate trap, and a reference pressure differential dP' between the upstream side and the downstream side of the particulate trap is calculated or is read out from the map at the time when the amount of exhaust gas corresponding to the engine speed Ne has passed through the particulate trap. Then, at step 1009, it is determined if a preset value C is exceeded by a difference between the reference pressure differential dP' calculated at step 1008 and a practical pressure differential measured relying on the outputs of the first and second pressure sensors 35, 36 disposed on the upstream side and the downstream side of the particulate trap. The difference calculated at step 1009 is a value brought about by the amount of the particulate that is practically trapped relative to the amount of exhaust gas corresponding to the engine speed Ne, and represents the amount of trapped particulate. When this difference is larger than the preset value C, therefore, the determination is true at step 1009 and it is determined at step 1010 to be the timing for regeneration. Thus, while the fuel-cut is carried out, the throttle valve is fully opened, and thus the amount of produced NOx does not increase and a maximum amount of exhaust gas corresponding to the engine speed is permitted to pass through the particulate trap. Therefore, the real pressure differential corresponding to the trapped particulate is explicitly increased, making it possible to correctly estimate the amount of trapped particulate. The preset value C used for determining the timing for regeneration may be varied in accordance with the engine speed.

Unlike the above-mentioned flowcharts for determining the timing for regeneration, this flowchart compares the reference pressure differential with the real pressure differential between the upstream side and the downstream side of the particulate trap. In order to correct the reference pressure differential when the particulate has not at all been trapped, the reference pressure differentials in the form of a map may be corrected based on the real pressure differentials of when the particulate trap is a new one as is done in the second flowchart. Further, the real pressure differential loses stability due to variation in the engine speed. As in the fourth flowchart, therefore, measurement of the real pressure differential may be delayed until the variation in the engine speed decreases. Further, the other ideas explained in the flowchart of determining the timing for regeneration based on the fresh intake air amount may be applied to this flowchart which determines the timing for regeneration based on the pressure differential.

In the above mentioned flowcharts, the determination is so rendered that it is the timing for regeneration when the difference between the reference value Gn' and the practically measured fresh intake air amount Gn becomes greater than the preset value even once. In order to render more correct determination, however, the timing for regeneration may be determined for the first time after the difference between the reference value Gn' and the practically measured fresh intake air amount Gn has exceeded the setpoint value repetitively. The timing for regeneration may be determined even when the difference that is repetitively calculated does not continuously become greater than the preset value but when the difference repetitively calculated has exceeded the setpoint value in a predetermined frequency. This idea can be also applied to determining the completion of the regeneration in the ninth flowchart and can be further applied to determining the timing for regeneration relying on the pressure differential due to the particulate trap as in the tenth flowchart.

Figure 13:
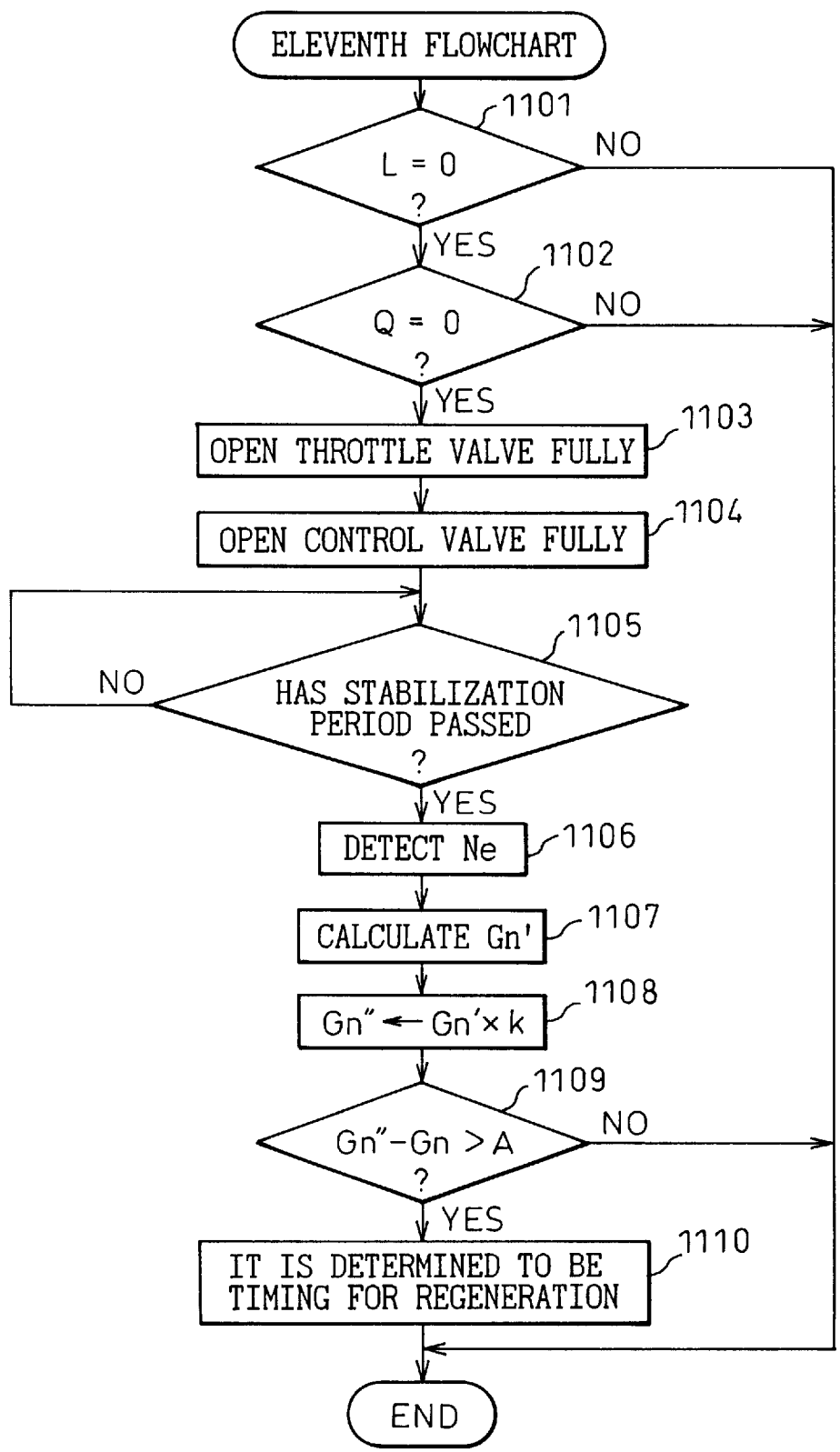
FIG. 13 is an eleventh flowchart for determining the completion of regeneration.

FIG. 13 is an eleventh flowchart for determining a timing for regeneration. Like the above mentioned flowcharts, when the fuel-cut is carried out, the reference fresh intake air amount Gn' is calculated or is read out from the map on the basis of the engine speed Ne at step 1107. Then, at step 1108, the reference value Gn' is corrected by being multiplied by a correction coefficient k. At step 1109, the thus corrected reference value Gn" is compared with the practical fresh intake air amount Gn. As in the above mentioned flowcharts, the timing for regeneration is determined by estimating the amount of particulate trapped by the particulate trap.

Figure 14:
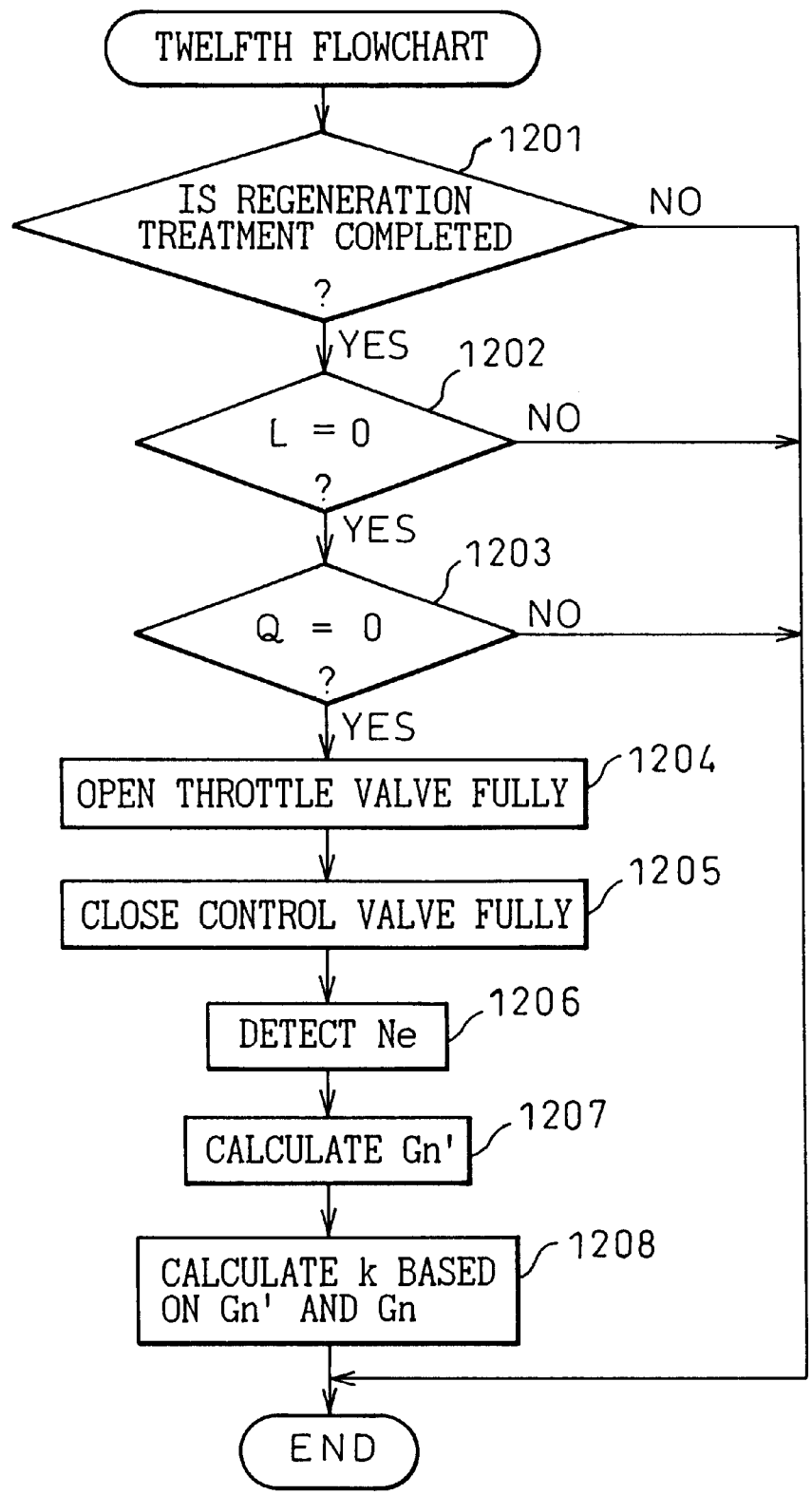
FIG. 14 is a twelfth flowchart for updating the correction coefficient used in the eleventh flowchart.

The correction coefficient k is, first, set to 1 or, preferably, is determined based on the reference value Gn' and the practical fresh intake air amount Gn when the fuel-cut is carried out in the first traveling of the vehicle. FIG. 14 is a twelfth flowchart for updating the correction coefficient. This flowchart is executed preceding the eleventh flowchart. At step 1201, first, it is determined if the regeneration treatment for the particulate trap is completed. When it is determined to be a timing for regeneration in the eleventh flowchart, the regeneration treatment is executed as described above. When the regeneration treatment is completed, the determination at step 1201 is true and it is determined at steps 1202 and 1203 if the fuel-cut is carried out.

When the fuel-cut has been carried out, the throttle valve 4 is set to be fully opened or nearly fully opened at step 1204. At step 1205, the control valve 7a is fully closed. Then, at step 1206, the current engine speed Ne is detected. At step 1207, a reference fresh intake air amount Gn' is calculated based on the current engine rotational speed Ne or is read out from the map by taking into consideration that the throttle valve has been fully opened, the control valve has been fully closed, and no particulate has been trapped by the particulate trap since the regeneration treatment has been completed.

At step 1208, a correction coefficient k is calculated based on the reference value Gn' and the practical fresh intake air amount Gn. The correction coefficient k may, for example, be Gn/Gn'. The practical fresh intake air amount Gn at this time is affected solely by the gas flow resistance through the engine intake system, since the control valve has been fully closed. That is, at first, the correction coefficient k is calculated depending upon the dispersion in the gas flow resistance through the air cleaner and the air flow meter. If the flow resistance of the air cleaner and the like gradually increases with the passage of time, the practical fresh intake air amount Gn gradually decreases, and the correction coefficient k gradually decreases correspondingly.

Thus, the eleventh flowchart uses a reference value Gn' corrected by the correction coefficient k. Therefore, the timing for regenerating the particulate trap is determined by taking into consideration the fact that the practical fresh intake air amount Gn decreases with an increase in the flow gas resistance through the engine intake system irrespective of the amount of trapped particulate, preventing the timing for regeneration being determined even though the amount of trapped particulate is small. In the twelfth flowchart, the control valve is fully closed when the fuel-cut is carried out. Therefore, the twelfth flowchart cannot be executed simultaneously with the eleventh flowchart. Further, it becomes meaningless if the particulate is trapped again by the particulate trap and, hence, the correction coefficient k is calculated only once after the regeneration treatment for the particulate trap has been finished. Strictly, therefore, an optimum correction coefficient only is calculated at the engine speed Ne of this time. The correction coefficient k is a ratio of the fresh intake air amount Gn to the reference value Gn', and can be applied to any other engine speed to a sufficient degree.

Figure 15:
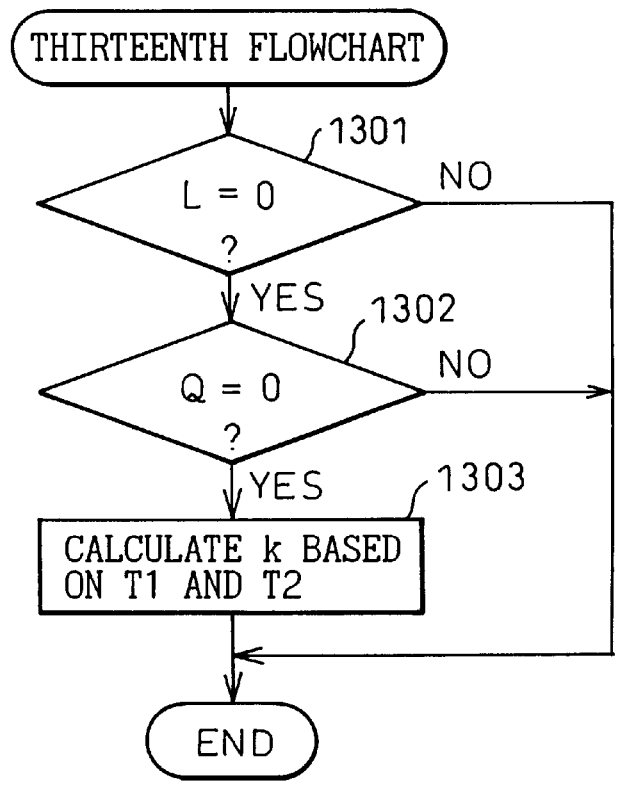
FIG. 15 is a thirteenth flowchart for updating the correction coefficient used in the eleventh flowchart.

FIG. 15 is a thirteenth flowchart for updating the correction coefficient, instead of using the twelfth flowchart. In this flowchart, the eleventh flowchart is not interrupted to determine the timing for regeneration immediately after the completion of the regeneration treatment for the particulate trap, that was done in the twelfth flowchart; i.e., the flowchart is executed simultaneously with the determination of the timing for regeneration. When it is determined at steps 1301 and 1302 that the fuel-cut has been carried out, a correction coefficient k is calculated at step 1303 based on the gas temperature T1 near the portion where the exhaust gas recirculation passage 7 is connected to the engine exhaust system and on the gas temperature T2 near the portion where the exhaust gas recirculation passage 7 is connected to the engine intake system. The gas temperatures T1 and T2 are detected by the first and second gas temperature sensors 37 and 38. As for the gas temperature T2 of the engine intake system, however, the thermal expansion as a result of receiving heat is small and, hence, the external air temperature may be used. To calculate the correction coefficient k, a gas partial pressure P1 in the engine exhaust system caused by a rise in the temperature is found based on the gas temperature T1 and the volume V1 of the engine exhaust system on the upstream of the particulate trap. Further, a gas pressure P2 in the engine intake system caused by a rise in the temperature is found based on the gas temperature T2 and the volume V2 of the engine intake system on the downstream of the throttle valve. The gas pressure P2 may be regarded to be nearly the atmospheric pressure and may, hence, be regarded to be 0. The pressure differential $\Delta P$ (P1−P2) is chiefly generated by the thermal expansion of the gas that receives heat from the engine exhaust system, and works to recirculate part of the exhaust gas through the exhaust gas recirculation passage 7 irrespective of the amount of trapped particulate.

The recirculating gas amount is proportional to $\Delta P^{1/2}$ and, hence, the correction coefficient k may be given by $1-C1 \times \Delta P^{1/2}$ (C1 is a constant). Thus, the eleventh flowchart uses the reference value Gn" corrected by this correction coefficient k, and the timing for regenerating the particulate trap is determined by taking into consideration the fact that the practical fresh intake air amount Gn decreases due to the thermal expansion of the gas that receives heat from the engine exhaust system irrespective of the amount of trapped particulate, preventing such an occurrence that the timing for regeneration is determined even though the amount of trapped particulate is small.

Figure 16:
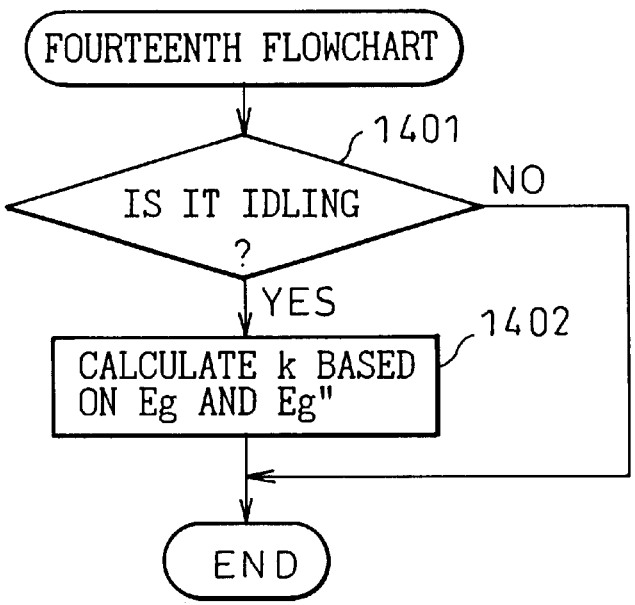
FIG. 16 is a fourteenth flowchart for updating the correction coefficient used in the eleventh flowchart.

FIG. 16 is a fourteenth flowchart for updating the correction coefficient and is executed instead of using the twelfth flowchart and the thirteenth flowchart. In this flowchart, the correction coefficient k is calculated based on the practical opening degree Eg of the control valve 7a and the reference opening degree Eg" every time when the engine operating condition is idling. During the idle condition as described above, the opening degree of the control valve 7a is controlled by feedback to supply a desired amount of the fresh air into the cylinder to realize a stable combustion. When the practical opening degree Eg is larger than the reference opening degree Eg", it means that the gas flow resistance through the exhaust gas recirculation passage is increasing due to the adhesion of particulates to the control valve 7a, exhaust gas recirculation passage 7 and exhaust gas cooler 7b. Therefore, a part of the exhaust gas that should recirculate does not really recirculate through the exhaust gas recirculation passage 7 in compliance with the amount of trapped particulate, and the practical fresh intake air amount increases correspondingly.

The amount of this gas is proportional to Eg/Eg" and, hence, the correction coefficient k can be given by 1+C2·Eg/Eg" (C2 is a constant). Thus, the eleventh flowchart uses the reference value Gn" corrected by the correction coefficient k, and the timing for regenerating the particulate trap is determined by taking into consideration the fact that the practical fresh intake air amount Gn does not decrease to a sufficient degree in accordance with the amount of trapped particulate due to an increase in the gas flow resistance through the exhaust gas recirculation passage, preventing such an occurrence that it is not still the timing for regeneration even though the amount of trapped particulate is large. In the twelfth, thirteenth and fourteenth flowcharts, the correction coefficient k was updated alone for simplifying the explanation. However, a currently optimum correction coefficient may be calculated by combining the respective ideas together.

Figure 17:
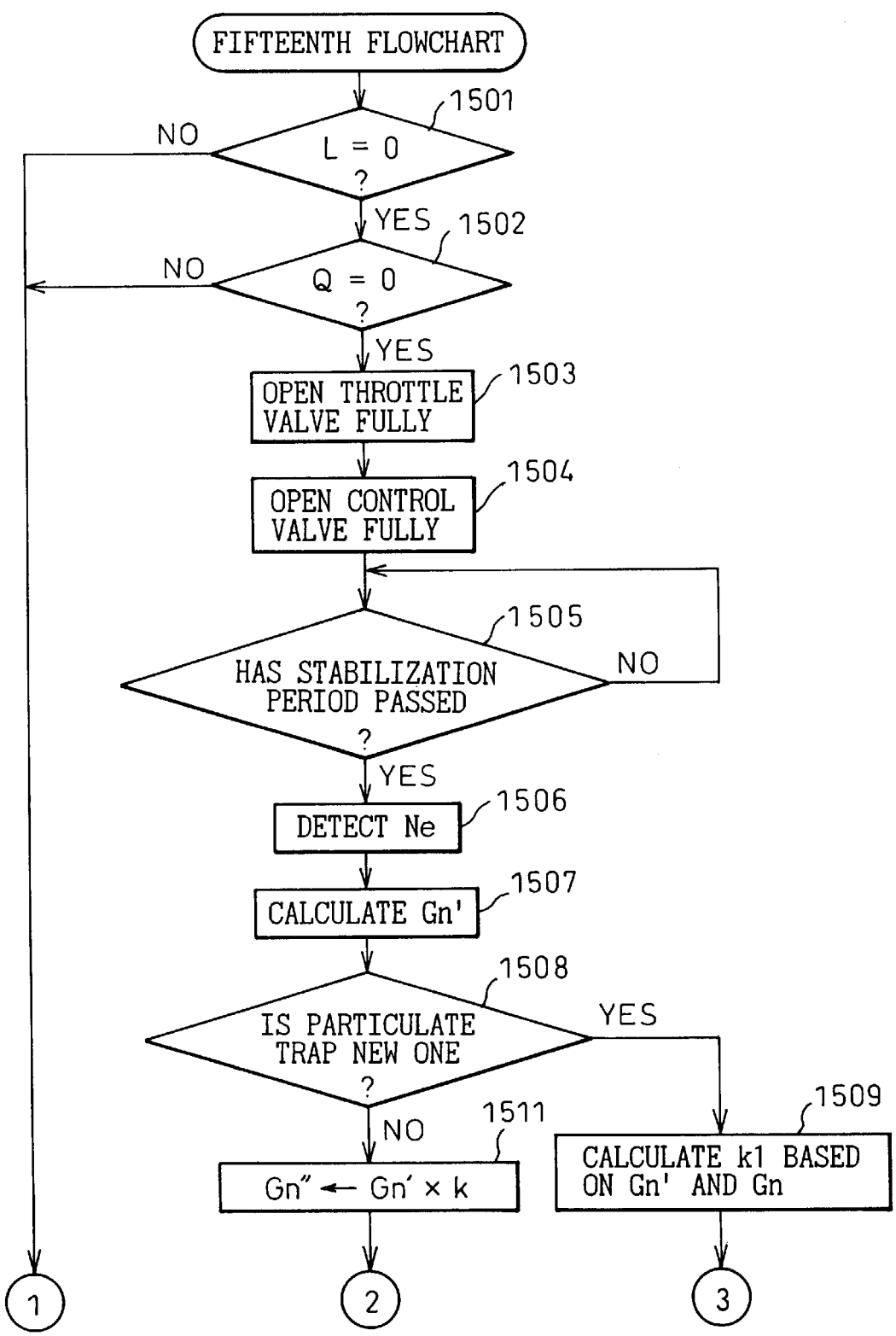
FIG. 17 is a part of a fifteenth flowchart for determining the completion of regeneration.
Figure 18:
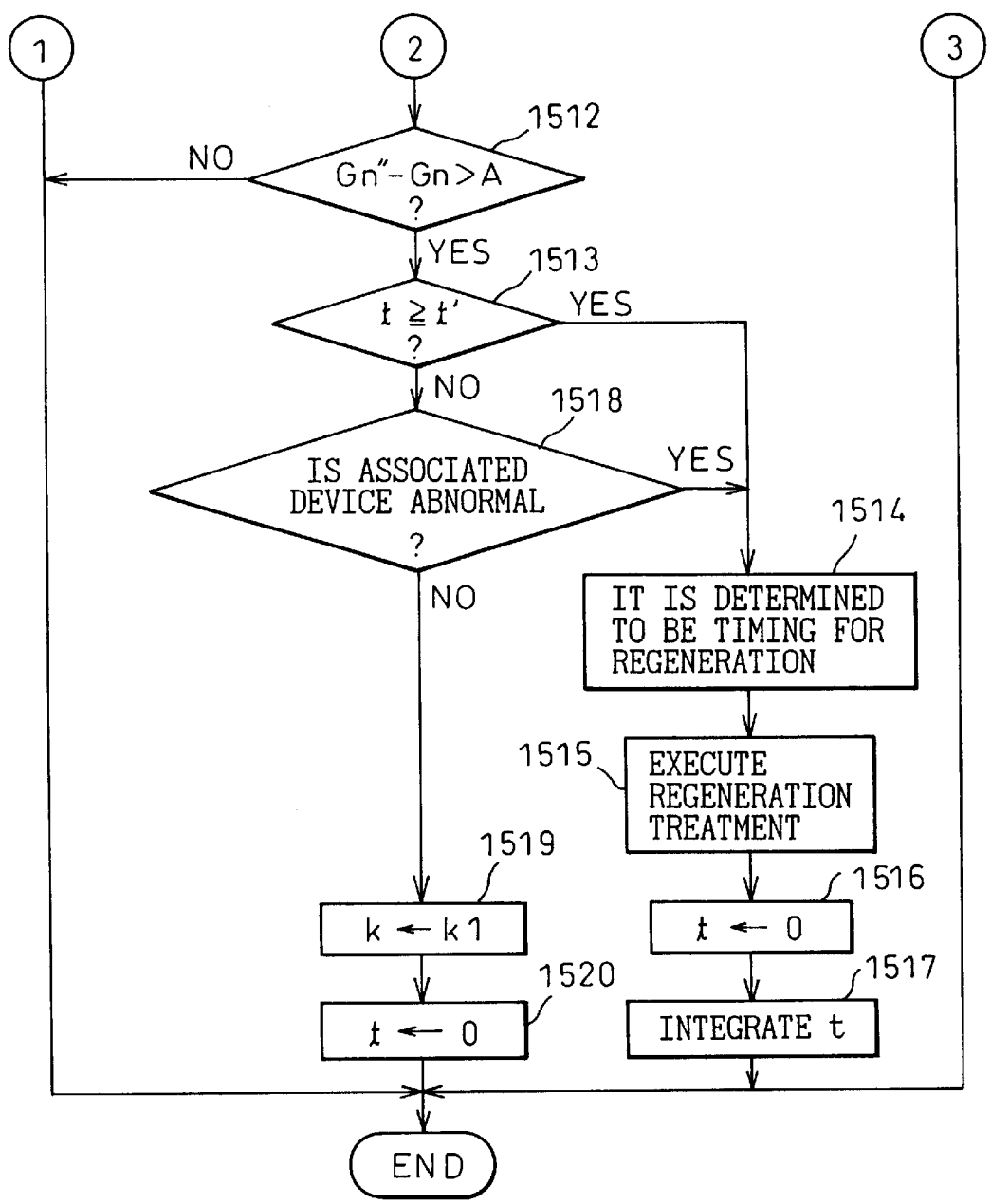
FIG. 18 is the remaining part of the fifteenth flowchart.

FIGS. 17 and 18 illustrate a fifteenth flowchart for determining the timing for regeneration. When the fuel-cut is carried out like the above-mentioned flowcharts, a reference fresh intake air amount Gn' is calculated or is read out from the map based on the engine speed Ne at step 1507. Then, at step 1508, it is determined if the particulate trap is a new one, as in the second flowchart. When this determination is true, the routine proceeds to step 1509 where a correction coefficient k1 is calculated based on the reference value Gn' and the practical fresh intake air amount Gn. The correction coefficient k1 may be, for example, Gn/Gn'. When the particulate trap is a new one, the amount of trapped particulate is 0, and Gn/Gn' should become 1. Due to dispersion in the engine intake system and the engine exhaust system, however, Gn/Gn' may assume a value other than 1. Then, at step 1510, the practical correction coefficient k is set to be k1. Since the particulate trap is a new one, the timing for regeneration need not be determined, and the routine ends.

When the particulate trap is no longer a new one, on the other hand, the determination is false at step 1508 and the routine proceeds to step 1511 where the reference value Gn' is corrected by the correction coefficient k to newly calculate a reference value Gn". Then, at step 1512, it is determined if a predetermined value A is exceeded by a difference between the reference value Gn" and the practical fresh intake air amount Gn. When the determination is false, the routine ends. When the determination is true, however, it is determined at step 1513 if the interval t between the regeneration treatment and the last regeneration treatment is longer than a preset interval t'. The preset interval t' is the shortest time interval in which the particulate trap needs not be regenerated depending upon its capacity even when an engine operation has continued emitting particulate in large amounts. When this determination is true, it is determined at step 1514 that it is the timing for regeneration, the regeneration treatment is executed at step 1515, the interval t between the regeneration treatment and the last regeneration treatment is reset to 0 at step 1516, and the interval t is integrated again at step 1517.

The correction coefficient k used in the fifteenth flowchart is updated by the sixteenth flowchart shown in FIG. 19. The sixteenth flowchart will be explained, first. In this flowchart, when the fuel-cut is carried out immediately after the completion of the regeneration treatment of the particulate trap, the throttle valve and the control valve are fully opened, and a correction coefficient k2 (Gn/Gn') is calculated from the practical fresh intake air amount Gn and the reference value Gn' calculated or read out from the map based on the engine speed Ne. At step 1609, it is determined if the thus calculated correction coefficient k2 is greater than the correction coefficient k that is now used. When this determination is false, the routine ends without updating the correction coefficient k.

When the determination is true at step 1609, the routine proceeds to step 1610 where it is determined if the correction coefficient k2 calculated at step 1608 is greater than the setpoint value G. When the determination is true, the correction coefficient k2 is abnormally great and there is some problem in the method of calculation up to step 1608. Therefore, the routine ends without updating the correction coefficient k. When the determination is false at step 1610, on the other hand, a correction coefficient k2 calculated at this time is used as the practical correction coefficient k at step 1611.

Thus, the correction coefficient is updated only when the newly calculated correction coefficient k2 is to be used for correcting the reference value Gn' into a large value which, however, is not abnormally large. This enables the determination to be easily affirmed at step 1512 in the fifteenth flowchart, preventing such an occurrence that the timing for regeneration is not determined even though the particulate trap has trapped the particulate including the particulate remained even after the regeneration treatment in an amount larger than the amount which requires the regeneration. This not only prevents a drop in the engine output but also reliably prevents such an occurrence that the particulate is burned in large amounts at one time causing the particulate trap to be melted.

Returning to the fifteenth flowchart, the routine proceeds to step 1518 when the interval t between the regeneration treatment and the last regeneration treatment is shorter than the preset interval t' even though the predetermined value A is exceeded by the difference between the corrected reference value Gn" and the practical fresh intake air amount Gn' at step 1512. At step 1518, it is determined if the associated device is abnormal, e.g., if the control unit is abnormal, the fuel injection system is abnormal or the exhaust gas recirculation system is abnormal. When at least one of these systems is abnormal, it is considered that the interval t may become shorter than the preset interval t', and the processing is executed at step 1514 and at subsequent steps.

However, when the interval t becomes shorter than the preset interval t' even though all the devices are normal, it is regarded that there is a problem concerning updating the correction coefficient in the sixteenth flowchart. At step 1519, therefore, the correction coefficient k is returned back to the correction coefficient k1 that was calculated when the particulate trap was new. At step 1520, then, the interval t is reset to 0, and the routine ends without executing the regeneration treatment.

According to the fifteenth and sixteenth flowcharts, as described above, the particulate trap is frequently regenerated as required. The particulate trap, however, is not regenerated in excess of the required frequency. Thus the regeneration of the particulate trap can be executed effectively.

What is claimed is:

1. A device for purifying the exhaust gas of an internal combustion engine comprising:
   a particulate trap disposed in the engine exhaust system;
   an exhaust gas recirculation passage communicating the upstream of said particulate trap in said engine exhaust system with the engine intake system;
   a control valve for controlling the amount of exhaust gas recirculated through said exhaust gas recirculation passage to be an optimum amount in accordance with an engine operating condition;
   a fresh air detection means for detecting an amount of fresh air introduced into said engine intake system during a fuel-cut; and
   an estimation means for estimating an amount of particulate trapped by said particulate trap on the basis of said amount of fresh air detected by said fresh air detection means after said control valve is opened to a predetermined opening degree.

2. A device according to claim 1, wherein, in order to estimate said amount of particulate, said estimation means compares said amount of fresh air detected by said fresh air detection means with a reference value, and said reference value is corrected on the basis of said amount of fresh air detected by said fresh air detection means after said control valve is opened to said predetermined opening degree when said particulate trap is new.

3. A device according to claim 1, wherein it is inhibited that said estimation means estimates said amount of particulate when a fluctuation degree in the engine speed during said fuel-cut is greater than a preset degree.

4. A device according to claim 1, wherein it is inhibited that said estimation means estimates said amount of particulate when a temperature of said particulate trap is lower than a preset temperature.

5. A device according to claim 1, wherein said fresh air detection means detects said amount of fresh air for said estimation means to estimate said amount of particulate after a stabilization period has passed from when said control valve was opened to said predetermined opening degree, and said stabilization period is varied in accordance with an engine operating condition immediately before said fuel-cut.

6. A device according to claim 1, further comprising a gas flow resistance detection means for detecting directly or indirectly a gas flow resistance through said exhaust gas recirculation passage, and it is inhibited that said estimation means estimates said amount of particulate when said gas flow resistance detected by said gas flow resistance detection means is larger than a preset resistance.

7. A device according to claim 1, wherein a regeneration treatment for said particulate trap is executed when said amount of particulate estimated by said estimation means is larger than a preset amount, and it is inhibited that said estimation means estimates said amount of particulate during said regeneration treatment.

8. A device according to claim 1, wherein a turbine of a turbo charger is disposed on the downstream of a portion where said exhaust gas recirculation passage is connected to said engine exhaust system, and said fresh air detection means detects said amount of fresh air for said estimation means to estimate said amount of particulate after said control valve is opened to a predetermined opening degree and after a pressure differential between the upstream side and the downstream side of said turbine is lowered.

9. A device according to claim 1, wherein, in order to estimate said amount of particulate, said estimation means compares said amount of fresh air detected by said fresh air detection means with a reference value, and said reference value is corrected by taking into consideration a change of gas pressure caused by a thermal expansion in said engine exhaust system.

10. A device according to claim 1, wherein, in order to estimate said amount of particulate, said estimation means compares said amount of fresh air detected by said fresh air detection means with a reference value, and said reference value is corrected by taking into consideration a change of gas flow resistance in said engine intake system.

11. A device according to claim 1, wherein, in order to estimate said amount of particulate, said estimation means compares said amount of fresh air detected by said fresh air detection means with a reference value, a regeneration treatment for said particulate trap is executed when said amount of particulate estimated by said estimation means is larger than a preset amount, said reference value is corrected on the basis of said amount of fresh air detected by said fresh air detection means immediately after the completion of said regeneration treatment, and said reference value is updated only when said reference value is corrected to increase.

12. A device according to claim 11, wherein, when a interval between said regeneration treatment and the last regeneration treatment is shorter than a preset interval, it is determined that said reference value corrected to increase is not appropriate.

13. A device according to claim 1, wherein, in order to estimate said amount of particulate, said estimation means compares said amount of fresh air detected by said fresh air detection means with a reference value, and said reference value is corrected by taking into consideration a change of gas flow resistance in said exhaust gas recirculation passage.

14. A device for purifying the exhaust gas of an internal combustion engine comprising:

a particulate trap disposed in the engine exhaust system;

an exhaust gas recirculation passage communicating the upstream of said particulate trap in said engine exhaust system with the engine intake system;

a control valve for controlling the amount of exhaust gas recirculated through said exhaust gas recirculation passage to be an optimum amount in accordance with the engine operating condition;

a pressure differential detection means for detecting directly or indirectly a pressure differential between the upstream side and the downstream side of said particulate trap during a fuel-cut after said control valve is fully closed and after a throttle valve disposed on said engine intake system is fully opened; and an estimation means for estimating an amount of particulate trapped by said particulate trap on the basis of said pressure differential detected by said pressure differential detection means.

* * * * *